US012089245B2

(12) United States Patent
Santhanam et al.

(10) Patent No.: US 12,089,245 B2
(45) Date of Patent: Sep. 10, 2024

(54) TECHNIQUES FOR ENHANCED HANDLING OF NETWORK MEASUREMENTS

(71) Applicant: QUALCOMM Incorporated, San Diego, CA (US)

(72) Inventors: Arvind Vardarajan Santhanam, San Diego, CA (US); Nitin Pant, San Diego, CA (US); Ertugrul Necdet Ciftcioglu, San Diego, CA (US); Sumit Kumar Singh, San Marcos, CA (US); Kavya Putluri, San Diego, CA (US); Touseef Khan, San Diego, CA (US); Manjinder Singh Sandhu, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 415 days.

(21) Appl. No.: 17/519,393

(22) Filed: Nov. 4, 2021

(65) Prior Publication Data
US 2022/0150904 A1     May 12, 2022

Related U.S. Application Data

(60) Provisional application No. 63/110,911, filed on Nov. 6, 2020.

(51) Int. Cl.
*H04W 72/08*     (2009.01)
*H04W 72/0453*     (2023.01)
(Continued)

(52) U.S. Cl.
CPC ..... *H04W 72/542* (2023.01); *H04W 72/0453* (2013.01); *H04W 72/23* (2023.01); *H04W 72/56* (2023.01); *H04W 76/10* (2018.02)

(58) Field of Classification Search
CPC ..... H04W 24/10; H04W 48/16; H04W 72/04; H04W 52/0209; H04W 72/0453;
(Continued)

(56) References Cited

U.S. PATENT DOCUMENTS

| 8,639,239 B2 * | 1/2014 | Uemura | ............ H04W 36/0088 |
| | | | 455/67.11 |
| 9,084,148 B2 * | 7/2015 | Uemura | ................ H04W 24/08 |

(Continued)

FOREIGN PATENT DOCUMENTS

EP     3454602 A1     3/2019

OTHER PUBLICATIONS

International Search Report and Written Opinion—PCT/US2021/058180—ISA/EPO—Feb. 16, 2022 (2100496WO).

*Primary Examiner* — Jung Liu
(74) *Attorney, Agent, or Firm* — Dalei Dong; Holland & Hart LLP

(57) ABSTRACT

Methods, systems, and devices for wireless communications are described. A user equipment (UE) may establish a radio resource control (RRC) connection with a base station. The UE may receive, from the base station, parameters associated with a set of frequency bands, the parameters indicating a priority of each frequency band of the set of frequency bands. The UE may then measure, based on the priority, one or more frequencies of at least one frequency band of the set of frequency bands. The UE may then transmit, after a time delay and to the base station, a measurement report including measurements of one or more frequency bands of the set of frequency bands.

30 Claims, 15 Drawing Sheets

(51) Int. Cl.
*H04W 72/23* (2023.01)
*H04W 72/542* (2023.01)
*H04W 72/56* (2023.01)
*H04W 76/10* (2018.01)

(58) Field of Classification Search
CPC . H04W 88/02; H04W 36/0085; H04W 72/56; H04W 76/10; H04W 72/542; H04W 36/00837; H04W 72/23; H04W 36/0094; H04L 5/0048; Y02D 30/70
See application file for complete search history.

(56) References Cited

U.S. PATENT DOCUMENTS

| | | | |
|---|---|---|---|
| 9,338,591 B1* | 5/2016 | Vivanco | H04W 36/0088 |
| 10,200,942 B2* | 2/2019 | Uchiyama | H04W 48/16 |
| 10,652,805 B2* | 5/2020 | Uchiyama | H04W 24/10 |
| 2015/0029917 A1* | 1/2015 | Kim | H04W 52/0209 |
| | | | 370/311 |
| 2015/0281989 A1 | 10/2015 | Yang et al. | |
| 2016/0205573 A1 | 7/2016 | Yang et al. | |
| 2017/0055202 A1* | 2/2017 | Uchiyama | H04W 24/10 |
| 2017/0295574 A1 | 10/2017 | Stark et al. | |
| 2020/0022073 A1* | 1/2020 | Yang | H04W 76/11 |

* cited by examiner

TECHNIQUES FOR ENHANCED HANDLING OF NETWORK MEASUREMENTS

CROSS REFERENCE

The present application for patent claims the benefit of U.S. Provisional Patent Application No. 63/110,911 by SANTHANAM et al., entitled "TECHNIQUES FOR ENHANCED HANDLING OF NETWORK MEASUREMENTS," filed Nov. 6, 2020, assigned to the assignee hereof, and which is hereby incorporated by reference in its entirety.

FIELD OF DISCLOSURE

The present disclosure, for example, relates to wireless communications, more particularly to techniques for enhanced handling of network measurements.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

A UE may measure frequency bands and transmit measurement reports of the frequency bands to a base station. However, the UE may not measure the frequency bands in any order, which may lead to reporting of lower quality frequency bands.

SUMMARY

The described techniques relate to improved methods, systems, devices, and apparatuses that support techniques for enhanced handling of network measurements. The described techniques provide for a user equipment (UE) measuring a set of frequencies according to a prioritization of parameters received from the network. The UE may establish a radio resource control (RRC) connection with a base station. The UE may receive, from the base station, parameters associated with a set of frequency bands, the parameters indicating a priority of each frequency band of the set of frequency bands. The UE may then measure, based on the priority, one or more frequencies of at least one frequency band of the set of frequency bands. The UE may then transmit, after a time delay and to the base station, a measurement report including measurements of one or more frequency bands of the set of frequency bands.

A method for wireless communications at a UE is described. The method may include establishing a radio resource control connection with a base station, receiving, from the base station, parameters associated with a set of multiple frequency bands, the parameters indicating a priority of each frequency band of the set of multiple frequency bands, measuring, based on the priority, one or more frequencies of at least one frequency band of the set of multiple frequency bands, and transmitting, after a time delay and to the base station, a measurement report including measurements of one or more frequency bands of the set of multiple frequency bands.

An apparatus for wireless communications at a UE is described. The apparatus may include a processor, memory in electronic communication with the processor, and instructions stored in the memory. The instructions may be executable by the processor to cause the apparatus to establish a radio resource control connection with a base station, receive, from the base station, parameters associated with a set of multiple frequency bands, the parameters indicating a priority of each frequency band of the set of multiple frequency bands, measuring, base at least in part on the priority, one or more frequencies of at least one frequency band of the set of multiple frequency bands, and transmit, after a time delay and to the base station, a measurement report including measurements of one or more frequency bands of the set of multiple frequency bands.

Another apparatus for wireless communications at a UE is described. The apparatus may include means for establishing a radio resource control connection with a base station, means for receiving, from the base station, parameters associated with a set of multiple frequency bands, the parameters indicating a priority of each frequency band of the set of multiple frequency bands, means for measuring, based on the priority, one or more frequencies of at least one frequency band of the set of multiple frequency bands, and means for transmitting, after a time delay and to the base station, a measurement report including measurements of one or more frequency bands of the set of multiple frequency bands.

A non-transitory computer-readable medium storing code for wireless communications at a UE is described. The code may include instructions executable by a processor to establish a radio resource control connection with a base station, receive, from the base station, parameters associated with a set of multiple frequency bands, the parameters indicating a priority of each frequency band of the set of multiple frequency bands, measuring, base at least in part on the priority, one or more frequencies of at least one frequency band of the set of multiple frequency bands, and transmit, after a time delay and to the base station, a measurement report including measurements of one or more frequency bands of the set of multiple frequency bands.

Some examples of the method, apparatuses, and non-transitory computer-readable medium described herein may further include operations, features, means, or instructions for transmitting, to the base station, an indication of the priority to measure each frequency band of the set of multiple frequency bands and receiving a configuration of the set of multiple frequency bands based on the indication.

In some examples of the method, apparatuses, and non-transitory computer-readable medium described herein, the indication of the priority may be based on a location of the UE. Some examples of the method, apparatuses, and non-transitory computer-readable medium described herein may further include operations, features, means, or instructions for configuring a measurement gap for each frequency band of the set of multiple frequency bands based on the priority.

In some examples of the method, apparatuses, and non-transitory computer-readable medium described herein, a first measurement gap may be associated with a first frequency band of the set of multiple frequency bands. In some examples of the method, apparatuses, and non-transitory computer-readable medium described herein, the measurements include reference signal received power measurements or reference signal received quality measurements, or a combination thereof.

Some examples of the method, apparatuses, and non-transitory computer-readable medium described herein may further include operations, features, means, or instructions for transmitting the measurement report of a first measurement of a first frequency band, based on the first measurement satisfying a measurement threshold.

In some examples of the method, apparatuses, and non-transitory computer-readable medium described herein, the measurement threshold includes a network measurement threshold and a UE measurement threshold.

Some examples of the method, apparatuses, and non-transitory computer-readable medium described herein may further include operations, features, means, or instructions for transmitting the measurement report after the time delay based on one or more frequencies of at least one measurement satisfying a network measurement threshold and failing to satisfy a UE measurement threshold.

Some examples of the method, apparatuses, and non-transitory computer-readable medium described herein may further include operations, features, means, or instructions for performing measurements of the one or more frequencies of at least one frequency band of the set of multiple frequency bands based on the time delay of transmitting the measurement report.

In some examples of the method, apparatuses, and non-transitory computer-readable medium described herein, the priority includes measuring each frequency band of the set of multiple frequency bands in an order of frequency range of each frequency band of the set of multiple frequency bands.

In some examples of the method, apparatuses, and non-transitory computer-readable medium described herein, the priority includes measuring each frequency band of the set of multiple frequency bands in order of a presence of each frequency band of the set of multiple frequency bands within a database.

In some examples of the method, apparatuses, and non-transitory computer-readable medium described herein, the priority includes measuring each frequency band of the set of multiple frequency bands based on a duplexing configuration of each frequency band of the set of multiple frequency bands.

In some examples of the method, apparatuses, and non-transitory computer-readable medium described herein, the priority includes measuring each frequency band of the set of multiple frequency bands based on a time to trigger configuration of each frequency band of the set of multiple frequency bands.

In some examples of the method, apparatuses, and non-transitory computer-readable medium described herein, the priority includes measuring each frequency band of the set of multiple frequency bands based on a system bandwidth configuration of each frequency band of the set of multiple frequency bands.

A method for wireless communications at a base station is described. The method may include establishing a radio resource control connection with a UE, transmitting, to the UE, parameters associated with a set of multiple frequency bands, the parameters indicating a priority of each frequency band of the set of multiple frequency bands, and receiving, after a time delay and from the UE, a measurement report including measurements of one or more frequency bands of the set of multiple frequency bands, the measurements performed according to the indicated priority.

An apparatus for wireless communications at a base station is described. The apparatus may include a processor, memory in electronic communication with the processor, and instructions stored in the memory. The instructions may be executable by the processor to cause the apparatus to establish a radio resource control connection with a UE, transmit, to the UE, parameters associated with a set of multiple frequency bands, the parameters indicating a priority of each frequency band of the set of multiple frequency bands, and receive, after a time delay and from the UE, a measurement report including measurements of one or more frequency bands of the set of multiple frequency bands, the measurements performed according to the indicated priority.

Another apparatus for wireless communications at a base station is described. The apparatus may include means for establishing a radio resource control connection with a UE, means for transmitting, to the UE, parameters associated with a set of multiple frequency bands, the parameters indicating a priority of each frequency band of the set of multiple frequency bands, and means for receiving, after a time delay and from the UE, a measurement report including measurements of one or more frequency bands of the set of multiple frequency bands, the measurements performed according to the indicated priority.

A non-transitory computer-readable medium storing code for wireless communications at a base station is described. The code may include instructions executable by a processor to establish a radio resource control connection with a UE, transmit, to the UE, parameters associated with a set of multiple frequency bands, the parameters indicating a priority of each frequency band of the set of multiple frequency bands, and receive, after a time delay and from the UE, a measurement report including measurements of one or more frequency bands of the set of multiple frequency bands, the measurements performed according to the indicated priority.

Some examples of the method, apparatuses, and non-transitory computer-readable medium described herein may further include operations, features, means, or instructions for receiving, from the UE, an indication of the priority to measure the frequency bands and transmitting a configuration of the set of multiple frequency bands based on the indication.

In some examples of the method, apparatuses, and non-transitory computer-readable medium described herein, the indication may be based on a location of the UE. In some examples of the method, apparatuses, and non-transitory computer-readable medium described herein, the measurements include reference signal received power measurements or reference signal received quality measurements, or a combination thereof.

Some examples of the method, apparatuses, and non-transitory computer-readable medium described herein may further include operations, features, means, or instructions for receiving the measurement report of a first measurement of a first frequency band, based on the first measurement satisfying a measurement threshold.

In some examples of the method, apparatuses, and non-transitory computer-readable medium described herein, the measurement threshold includes a network measurement threshold and a UE measurement threshold.

Some examples of the method, apparatuses, and non-transitory computer-readable medium described herein may further include operations, features, means, or instructions for receiving the measurement report after the time delay based on at least one measurement satisfying a network measurement threshold and failing to satisfy a UE measurement threshold.

In some examples of the method, apparatuses, and non-transitory computer-readable medium described herein, the priority includes measuring each frequency band of the set of multiple frequency bands in an order of frequency range of each frequency band of the set of multiple frequency bands.

In some examples of the method, apparatuses, and non-transitory computer-readable medium described herein, the priority includes measuring each frequency band of the set of multiple frequency bands in order of a presence of each frequency band of the set of multiple frequency bands within a database.

In some examples of the method, apparatuses, and non-transitory computer-readable medium described herein, the priority includes measuring each frequency band of the set of multiple frequency bands based on a duplexing configuration of each frequency band of the set of multiple frequency bands.

In some examples of the method, apparatuses, and non-transitory computer-readable medium described herein, the priority includes measuring each frequency band of the set of multiple frequency bands based on a time to trigger configuration of each frequency band of the set of multiple frequency bands.

In some examples of the method, apparatuses, and non-transitory computer-readable medium described herein, the priority includes measuring each frequency band of the set of multiple frequency bands based on a system bandwidth configuration of each frequency band of the set of multiple frequency bands.

DETAILED DESCRIPTION

Figure 1:
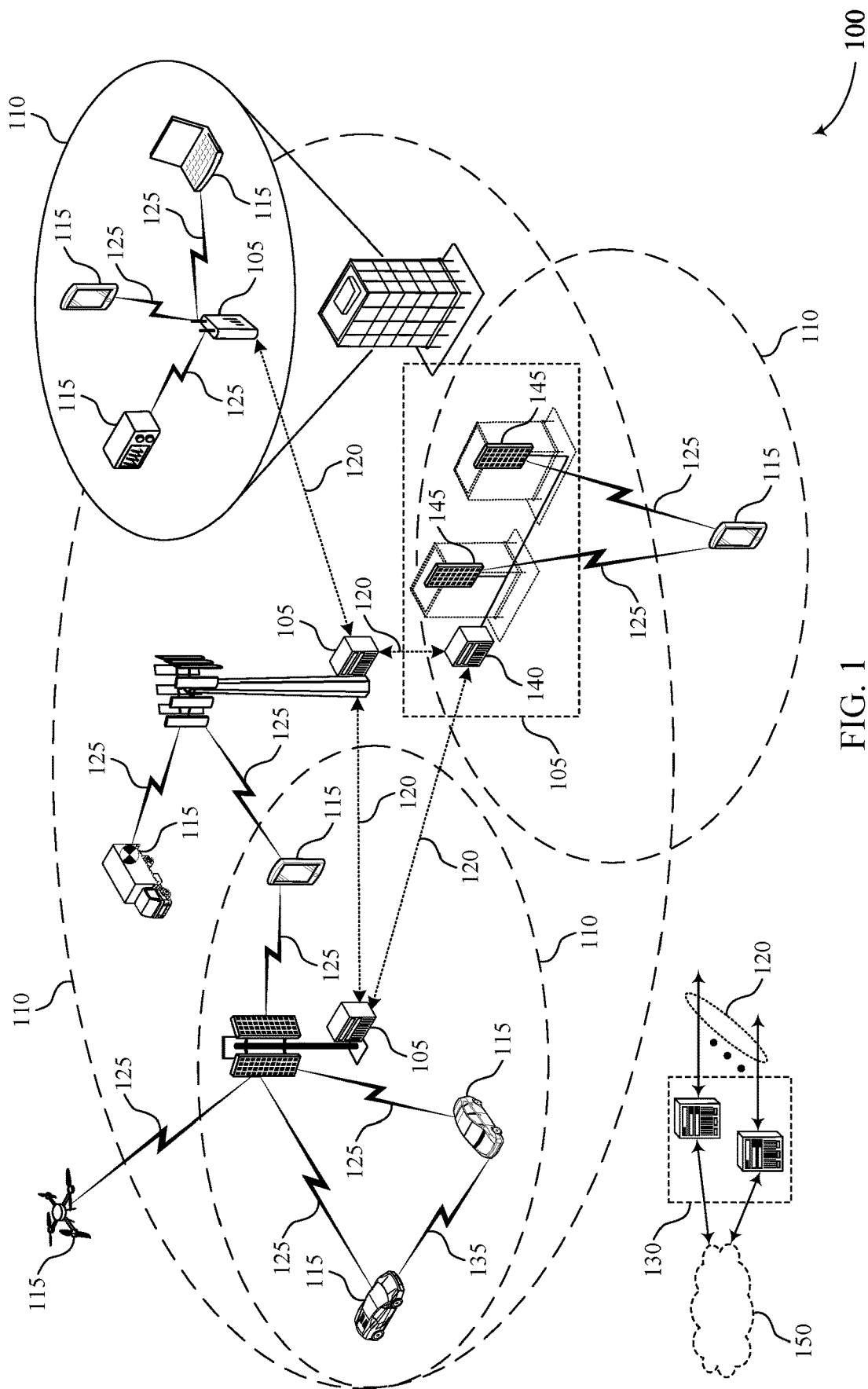
FIG. 1 illustrates an example of a wireless communications system that supports techniques for enhanced handling of network measurements in accordance with various aspects of the present disclosure.

A user equipment (UE) may operate in a wireless communication system, and may communicate with network devices, such as base stations. The UE may measure a number of measurement objects, such as different frequency bands, in order to determine factors such as channel quality for each frequency band. For example, the UE may measure a number of different absolute radio frequency channel numbers (ARFCNs). In some cases, the UE may receive an indication of a number of measurement objects (e.g., frequency bands) for the UE to measure. In some cases, the indication may not include an indication of an order in which the UE may measure the frequency bands. Without any indication of an order or priority, the UE may measure each frequency band in an order the frequency bands were received, or another order, without prioritizing the measurement of frequency bands.

For example, in some systems (e.g., fourth-Generation (4G) systems such as Long Term Evolution (LTE) systems), a UE may configure gaps for each measurement object in the same order that the network configured them (e.g., in the order that the measurement objects or frequency bands were received). The UE may measure each frequency band based on the measurement gap, and the UE may determine whether each measurement satisfies a threshold measurement level. In cases where a measurement threshold is met, the UE may determine to send a measurement report to the network (e.g., base station). The network may then identify the measured frequency band that satisfies a measurement threshold as a secondary cell group (SCG) on one of the cells for which the UE transmitted the measurement report. However, the network may add a secondary cell group on a cell based on the UE performing the measurements in a random order. As such, the cell may not correspond to a high quality or low interference cell when compared with the other frequency bands that were not yet measured. For example, the UE may transmit a measurement report for a first frequency that satisfies the threshold, when other frequency bands may surpass the threshold by a greater amount, and may therefore correspond to a higher quality cell. Further, in some cases, the UE may not support gapless measurements, which may impact throughput and lead to a performance degradation or increased latency.

Therefore, a UE may sort and prioritize a set of frequency bands indicated by the network based on a set of parameters. These parameters may be applied in a ranked order, where parameters are applied first, second, and so forth, in order to sort and prioritize the frequency bands. Some examples of parameters may include one or more of the following:

frequency range, the presence of the frequency band in a database, the duplex mode of the frequency band, the time to trigger (TTT) of the frequency band, the bandwidth, or any combination of the aforementioned, to name a few. These parameters may then be applied in a ranked order. For example, the frequency range parameter may be applied first, followed by the presence of the frequency band in a database parameter, followed by the duplex mode parameter, and so forth. By applying the parameters in a ranked order, the UE may produce a prioritized list of frequency bands. The UE may then open a set of measurement gaps for each frequency band based on the prioritized list (e.g., in a decreasing order).

The UE may then perform measurement of the frequency bands based on the highest priority frequency band first. The measurement of the frequency band may satisfy a criterion set by the network. When a frequency band satisfies the network criterion and a UE criterion (e.g., a UE threshold), the UE may transmit a measurement report for that frequency band to the network. However, in a case where the measurement is lower than the UE threshold (e.g., a threshold of a number of decibel milliwatts (dBm) for a reference signal received power (RSRP) or a number of decibel (dB) for a reference signal received quality (RSRQ)), the UE may delay sending the measurement report by some amount of time (e.g., a set number of milliseconds (ms)). Delaying transmitting the measurement report to the network may facilitate measurement of other configured frequencies, according to the sorted order. This may allow other frequency band options to be considered by the UE before a frequency band measurement report is reported to the network.

Due to this delay, the schedule for transmitting the frequency band measurement reports may not align with the schedule for measuring the frequency bands. However, this process may allow the UE to identify a frequency band (e.g., corresponding to a cell) that satisfies both the network threshold and the UE threshold. Once the UE identifies a cell that satisfies both thresholds, the UE may transmit a measurement report to the network that includes an indication of the identified frequency band. Therefore, the UE may measure and report one or more frequency bands that provide minimal impact on throughput. In the case where the network may be adding a cell as a second cell group (SCG), the prioritized frequency band measurement by the UE may prevent the network from adding an SCG on a relatively weaker cell.

Aspects of the disclosure are initially described in the context of wireless communications systems. Aspects of the disclosure are then described with respect to process flows. Aspects of the disclosure are further illustrated by and described with reference to apparatus diagrams, system diagrams, and flowcharts that relate to techniques for enhanced handling of network measurements.

FIG. 1 illustrates an example of a wireless communications system 100 that supports techniques for enhanced handling of network measurements in accordance with various aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell may cover a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-todevice (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands (e.g., in the range of 300 megahertz (MHz) to 300 gigahertz (GHz)). The region from 300 MHz to 3 GHz may be known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), unlicensed radio frequency spectrum band (e.g., LTE-Unlicensed (LTE-U)) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with an orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 may measure a set of frequencies according to a prioritization of parameters received from the network, via a base station 105 or another network device. The UE 115 may establish a RRC connection with a base station 105. The UE 115 may receive, from the base station 105, parameters associated with a set of frequency bands, the parameters indicating a priority of each frequency band of the set of frequency bands. The UE 115 may then measure, based on the priority, one or more frequencies of at least one frequency band of the set of frequency bands. The UE 115 may then transmit, after a time delay and to the base station 105, a measurement report including measurements of one or more frequency bands of the set of frequency bands.

Figure 2:
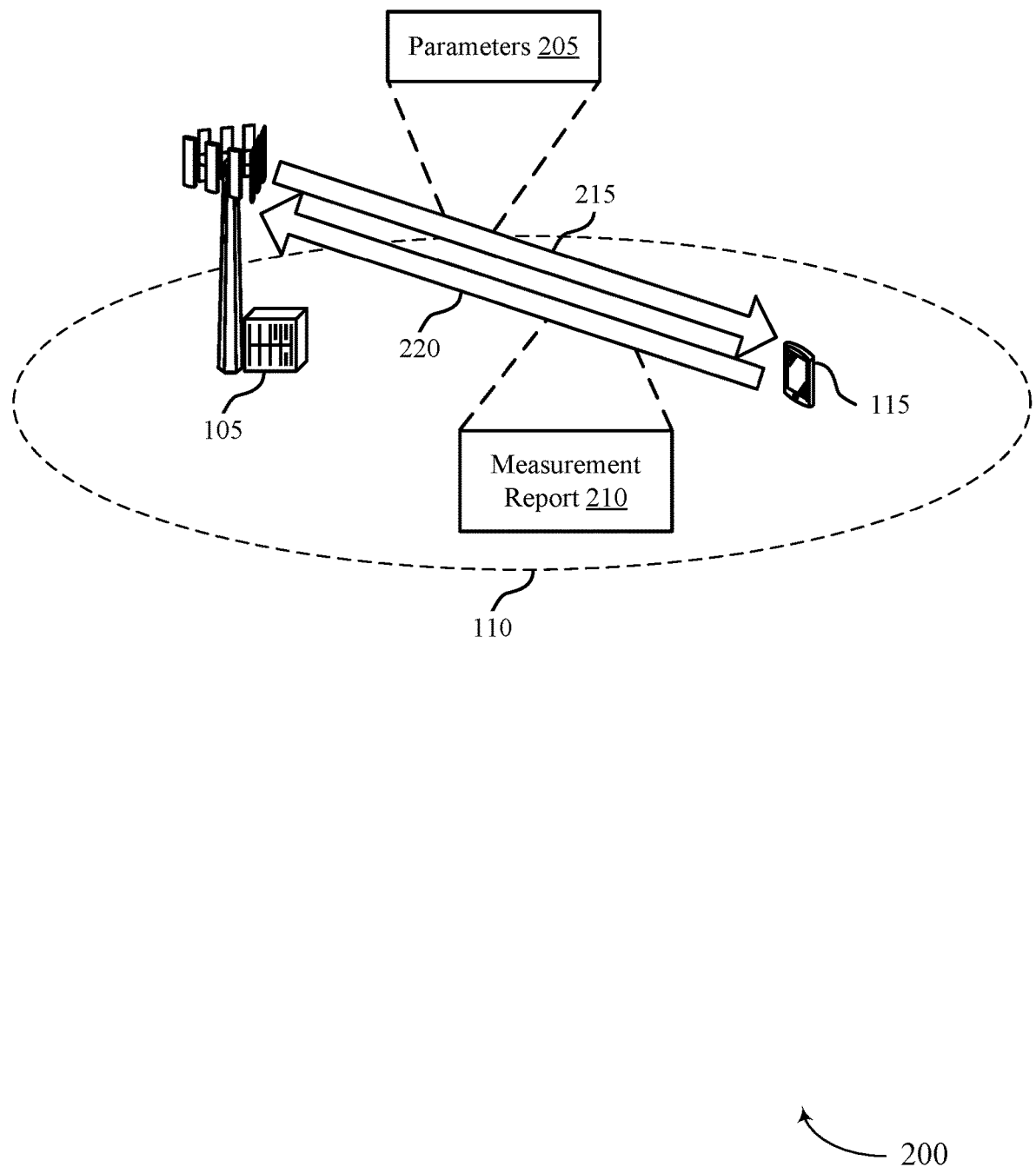
FIG. 2 illustrates an example of a wireless communications system that supports techniques for enhanced handling of network measurements in accordance with various aspects of the present disclosure.

FIG. 2 illustrates an example of a wireless communications system 200 that supports techniques for enhanced handling of network measurements in accordance with various aspects of the present disclosure. In some examples, wireless communications system 200 may implement aspects of wireless communications system 100 (as shown in FIG. 1). For example, wireless communications system 200 may include a base station 105 and a UE 115, which may be examples of the corresponding devices described with reference to FIG. 1. Wireless communications system may illustrate an example of a system that supports the simultaneous transmission of multiple uplink channels on a set of resources.

In some cases, the UE 115 may establish a RRC connection with the base station 105. Once the UE 115 establishes an RRC connection with the base station 105, the UE 115 may receive parameters 205 from the base station 105 over downlink channel 215. The parameters 205 may be associated with a series of frequency bands, where the parameters indicate a priority with which the UE 115 may measure the associated frequency bands. For example, the parameters may include one or more of the following: frequency range (FR), database presence, duplex mode, time to trigger (TTT), or the bandwidth of the frequency band, or any combination of the aforementioned. The parameters 205 may be applied to the series of frequency bands in a specific, ranked order, in order to sort the series of frequency bands based on priority. The ranked order in which to apply the parameters 205 may also be indicated to the UE 115 in signaling from the base station 105, or the UE 115 may determine the order.

For example, the UE 115 may receive parameters 205 and determine that the parameters may be applied in an order. In some cases, the order may be frequency range, database presence, duplex mode, TTT configuration, and the bandwidth configuration. Therefore, the frequency range parameter may be applied first to the series of frequency bands. For example, frequency ranges corresponding to a first frequency range (e.g., FR2 NR) may be prioritized over frequency bands corresponding to a second frequency range (e.g., FR1 LTE). In an example, a first frequency band's frequency range may correspond to FR1 and a second frequency band's frequency range may correspond to FR2. The parameters 205 may indicate that frequency bands in the FR2 frequency range are to be prioritized. Thus, the second frequency band in FR2 may be prioritized over the first frequency band. As a result, the series of frequency bands may be sorted such that the frequency bands in FR2 may be prioritized above the frequency bands in FR1.

Second, the database presence parameter may be applied to the series of frequency bands. Parameters 205 may indicate that a frequency band being present in a database is to be prioritized, therefore, the frequency bands that are present in a database may be prioritized above frequency bands that are not present in a database. As a result, the frequency bands may now be sorted in such a way that the higher priority frequency bands are those that are present in a database and in FR2.

Third, the duplex mode parameter may be applied to the series of frequency bands. Parameters 205 may indicate that frequency bands in time division duplex (TDD) bands are to be prioritized over frequency division duplex (FDD) bands. Therefore, TDD frequency bands may be prioritized over FDD frequency bands. As a result, the frequency bands may now be sorted in such a way that the higher priority frequency bands are those that are TDD frequency bands, are present in a database, and are correspond to FR2.

Fourth, the TTT parameter may be applied to the series of frequency bands. It may be that frequency bands with a lower TTT are to be prioritized over frequency bands with a higher TTT. Therefore, the frequency bands may be sorted in the order of lowest to highest TTT. As a result, the frequency bands may now be sorted in such a way that the higher priority frequency bands have the lowest TTT, are TDD frequency bands, are present in a database and are in FR2.

Fifth, the bandwidth parameter may be applied to the series of frequency bands. It may be that frequency bands with higher bandwidths are to be prioritized over lower bandwidths. Therefore, the frequency bands may be sorted in the order of highest to lowest bandwidth. As a result, the frequency bands may now be sorted in such a way that the higher priority frequency bands have the highest bandwidth, the lowest TTT, are TDD frequency bands, are present in a database, and are in FR2.

Once the UE 115 has applied the parameters in order, the series of frequency bands may have been sorted into a prioritized list. The UE 115 may then open gaps for the frequency bands in the decreasing order of priority. For example, the UE 115 may open a gap for the first listed frequency band, as the first frequency band may correspond to a highest priority frequency band. The UE 115 may then open a gap for the second listed frequency band as it may correspond to the second highest priority frequency band. The UE 115 may continue until it has opened gaps for the series of frequency bands in descending order. Once the gaps have been opened, the UE 115 may measure the frequency bands in decreasing order of priority.

The UE 115 may identify a network measurement threshold. The network measurement threshold may include an RSRP threshold or an RSRQ threshold, or both, set by the base station 105. The UE 115 may measure each frequency band in the order of priority, and the UE 115 may determine whether a measurement of a frequency band satisfies the network measurement threshold (e.g., satisfies either the RSRP network threshold or the RSRQ network threshold, or both). The UE 115 may then determine whether the measurement of the frequency band satisfies a UE threshold (e.g., UE measurement threshold different from the network measurement threshold, based on the network measurement threshold), which may correspond to a threshold of a number of decibel milliwatts (dBm) for the RSRP measurement or a number of decibel (dB) for the RSRQ measurement (e.g., relative to the network measurement threshold, as set by the UE or indicated by the base station, or both). When a frequency band measurement satisfies the network threshold and the UE threshold, then the UE may transmit a measurement report for that frequency band to the network. However, when the measurement of the frequency band does not satisfy the UE threshold (e.g., even though the measurement satisfies the network measurement threshold), then the UE 115 may delay sending a measurement report for a set amount of time. Thus, based on the delay, the UE 115 may continue measuring other frequency bands before reporting a frequency band measurement report.

In some examples, the network RSRP threshold may be set at −90 dBm and the network RSRQ threshold may be set at −15 dB. In some cases, the UE RSRP threshold may be set at −85 dBm (e.g., set 5 dBm greater than the network RSRP threshold) and the UE RSRQ threshold may be set at −10 dB (e.g., set 5 dB greater than the network RSRQ threshold). The UE may measure a frequency band and determine that the RSRP of the frequency band is −87 dBm and the RSRQ of the frequency band is −12 dB. Thus, the UE may determine that the −87 dBm RSRP measurement of the frequency band satisfies (e.g., is above) the network RSRP threshold of −90 dBm, that the −12 dB RSRQ measurement of the frequency band satisfies (e.g., is above) the network RSRQ threshold of −15 dB, but that the −87 dBm RSRP measurement of the frequency band does not satisfy (e.g., is below) the UE RSRP threshold of −85 dBm, and that the −12 dB RSRQ measurement of the frequency band satisfies (e.g., is below) the UE RSRQ threshold of −10 dB. Accordingly, the UE may delay sending a measurement report for a set amount of time, enabling the UE to perform additional frequency band measurements (e.g., according to priority). In some examples, the UE 115 may sort and measure, in order or priority, three different frequency bands. If the UE 115 were to not delay measurement reporting, UE 115 may transmit a measurement report for the first frequency band (e.g., corresponding to a highest priority), if the first frequency band satisfies a network threshold to the base station 105 without delay. In this case, the base station 105 may select a cell based on the first frequency band. However, the second and third frequency band, although having a lower priority than the first frequency band, may correspond to measurements that satisfy both the network threshold and the UE threshold. By delaying transmitting the measurement report of the first measured frequency band, the UE 115 may ensure that the measurement report for the frequency band that corresponds to higher quality and lower interference may transmitted first to the base station 105.

In another case, the UE 115 may sort a set of frequency bands identified by the UE 115 according to a set of parameters. The UE 115 may transmit an indication of the sorted frequency bands to the base station 105. This may allow the base station 105 to verify or modify the prioritized list according to other factors the UE 115. In some cases, the base station 105 may modify the prioritizes frequency band list according to load balancing at the base station 105. The base station 105 may modify the prioritized list and then transmit an indication of the modified list of frequency bands (e.g., a configuration of the frequency bands) to the UE 115. The UE 115 may then use the prioritized list modified and received from the base station 105 to determine an order to measure the frequency bands.

Figure 3:
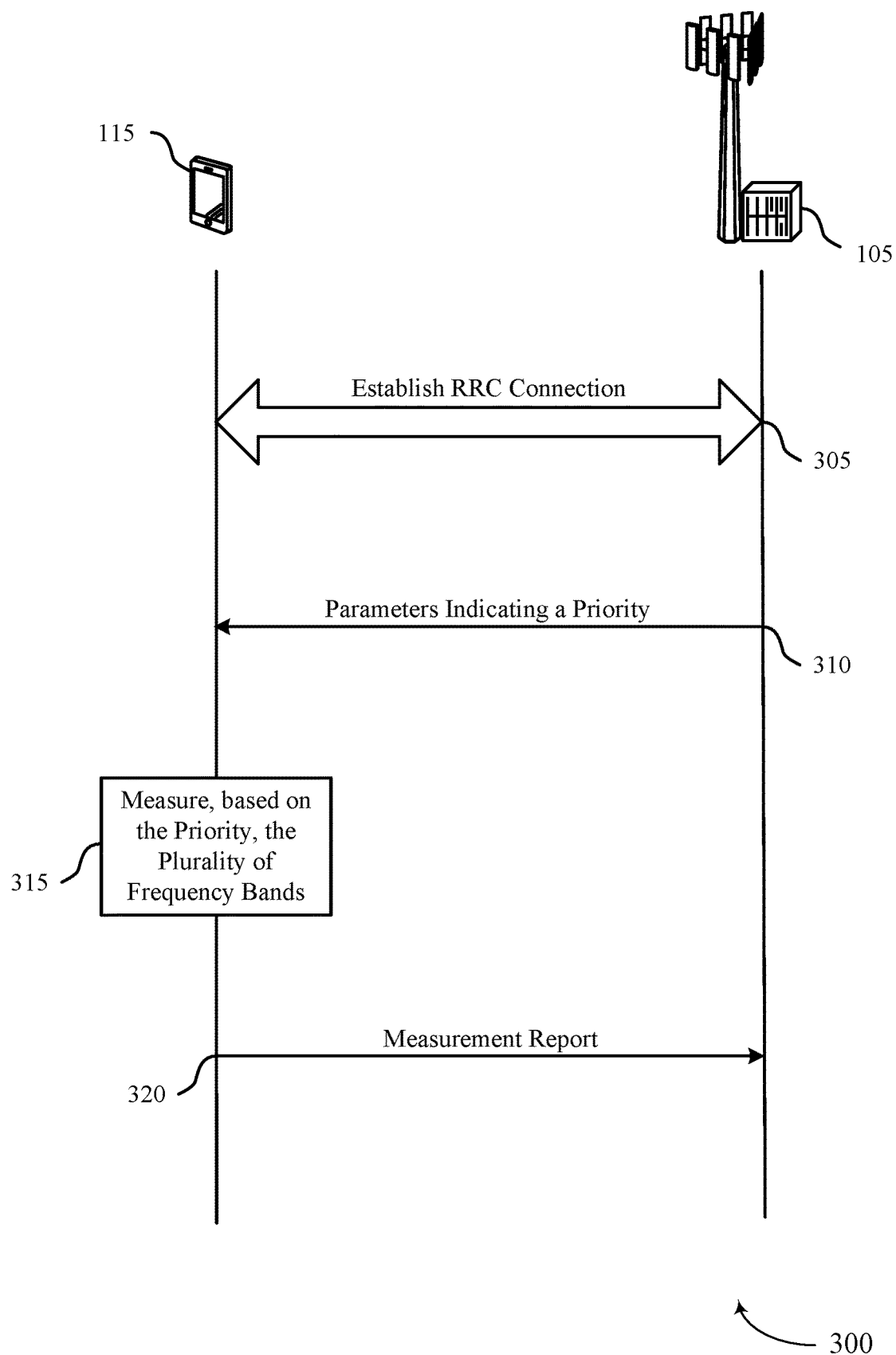
FIG. 3 illustrates an example of a process flow that supports techniques for enhanced handling of network measurements in accordance with various aspects of the present disclosure.

FIG. 3 illustrates an example of a process flow 300 that supports techniques for enhanced handling of network measurements in accordance with various aspects of the present disclosure. Process flow 300 may implement aspects of wireless communications systems 100 (as shown in FIG. 1) and wireless communications system 200 (as shown in FIG. 2). Process flow 300 includes a UE 115 and a base station 105, which may be examples of UEs 115 and base stations 105 as described with respect to FIGS. 1 and 2. UE 115 and base station 105 may communicate as part of a wireless communications system, such as wireless communications system 100 or wireless communications system 200.

At 305, UE 115 and base station 105 may establish a RRC connection. The RRC connected may be an example of a RRC Connected (e.g., RRC_Connected) mode for the UE 115.

In some cases, UE 115 may transmit, to base station 105, an indication of the priority to measure each frequency band of the set of frequency bands. In these cases, UE 115 may receive a configuration of the set of frequency bands based on the indication. The indication of the priority may be based on a location of the UE 115. For example, the indication of the priority may include an indication frequency bands that are available to the UE 115 at the location of the UE 115.

At 310, UE 115 may receive, from base station 105, parameters associated with a set of frequency bands. The parameters may indicate a priority of each frequency band of the set of frequency bands. UE 115 may sort each frequency band of the set of frequency bands based on the parameters. The priority may be determined based on measuring each frequency band of the set of frequency bands in an order of frequency range, presence of the frequency bands in a database, a duplexing configuration, a TTT configuration, and a system bandwidth configuration.

For example, UE 115 may sort the frequency bands first according to frequency range. In this case, the UE 115 may prioritize frequency bands that correspond to a first radio access technology (RAT) (e.g., NR, corresponding to FR2) over frequency bands corresponding to a second RAT (e.g., LTE, corresponding to FR1). Then, UE 115 may prioritize the frequency bands according to a presence in a database, where the UE 115 may prioritize frequency bands that are present in a database, over frequency bands that are not present in a database. Then, UE 115 may prioritize the frequency bands according to a duplexing configuration. For example, UE 115 may prioritize frequency bands that are configured for TDD (e.g., NR TDD) over frequency bands that are configured for FDD (e.g., NR FDD). Then, UE 115 may prioritize the frequency bands according to which frequency bands correspond to a low TTT. Then, UE 115 may prioritize the frequency bands according to frequency bands that correspond to a higher system bandwidth.

At 315, UE 115 may measure, based on the priority, each frequency band of the set of frequency bands. The measurements may include RSRP measurements, RSRQ measurements, or both. UE 115 may perform measurements of each frequency band according to the priority sorting performed based on the parameters.

UE 115 may configure a measurement gap for each frequency band of the set of frequency bands based on the priority. A first measurement gap may be associated with a first frequency band of the set of frequency bands.

At 320, UE 115 may transmit, to base station 105, a measurement report including measurements of one or more frequency bands of the set of frequency bands. UE 115 may transmit the measurement report of a first measurement of a first frequency band, based on the first measurement satisfying a measurement threshold. The measurement threshold may include a network measurement threshold and a UE measurement threshold. For example, UE 115 may measure a first frequency band, and UE 115 may determine that the first frequency band satisfies a network measurement threshold. The UE 115 may then determine whether the measurement of the first frequency band also satisfies a UE measurement threshold. Then, UE 115 may determine to transmit the measurement report based on the measurement of the first frequency band satisfying both measurement thresholds.

UE 115 may also transmit the measurement report after the time delay based on at least one measurement satisfying a network measurement threshold and failing to satisfy a UE measurement threshold. UE 115 may perform additional measurements of one or more frequency bands of the set of frequency bands (according to the priority list) based on the delay of transmitting the measurement report. For example, UE 115 may measure a first frequency band of the set of frequency bands. The first frequency measured may satisfy a network threshold, but may not satisfy a UE measurement threshold. In this case, UE 115 may delay transmission of the measurement report. The UE 115 may continue measuring the other frequency bands of the set of frequency bands during the delay. Therefore, the UE 115 may be able to identify a frequency band with a higher quality (e.g., satisfying the network measurement threshold and the UE measurement threshold) than the first frequency band, and UE 115 may transmit a report of the identified frequency band.

Figure 4:
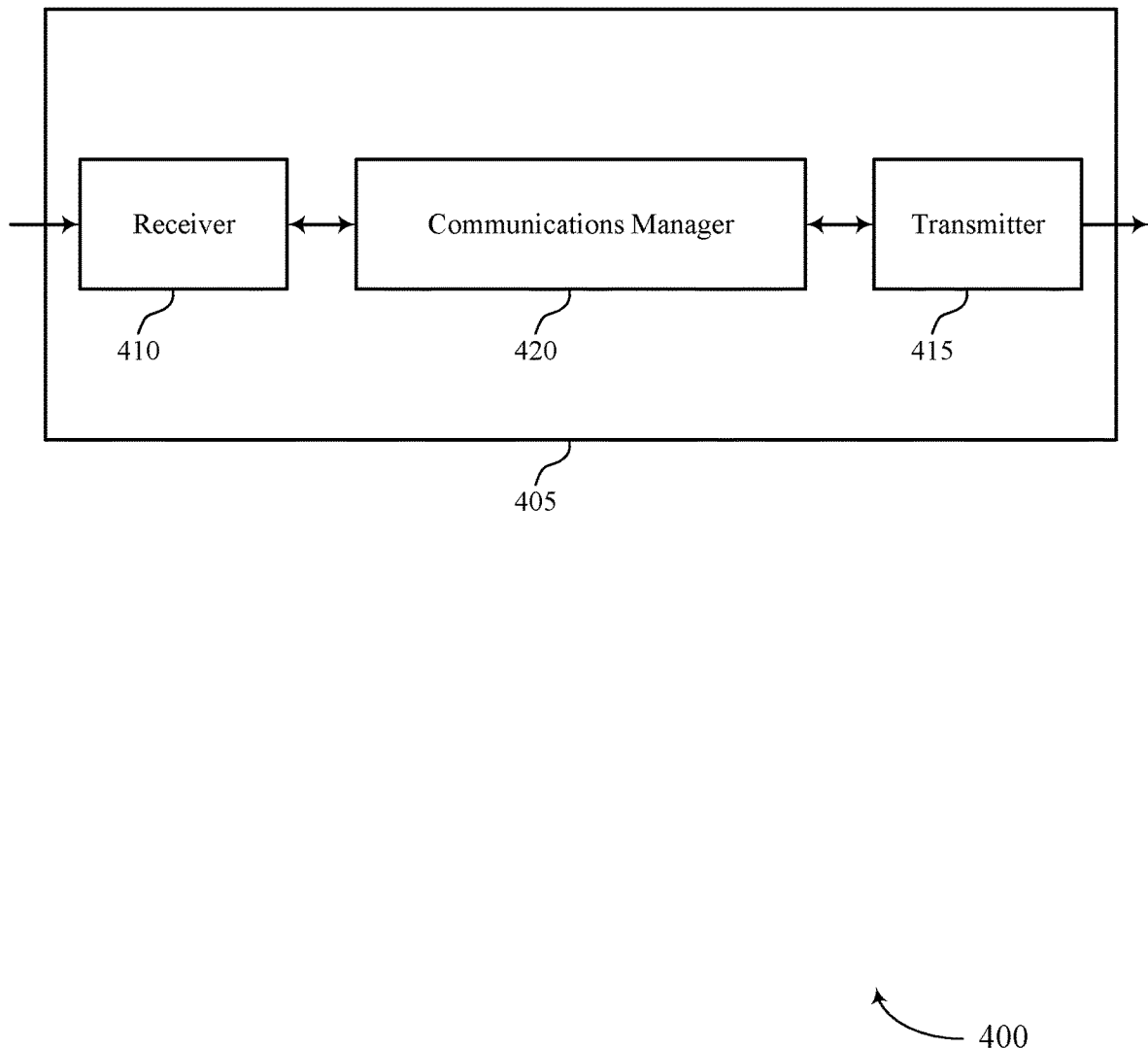
FIGS. 4 and 5 show block diagrams of devices that support techniques for enhanced handling of network measurements in accordance with various aspects of the present disclosure.

FIG. 4 shows a block diagram 400 of a device 405 that supports techniques for enhanced handling of network measurements in accordance with various aspects of the present disclosure. The device 405 may be an example of aspects of a UE 115 as described herein. The device 405 may include a receiver 410, a transmitter 415, and a communications manager 420. The device 405 may also include a processor. Each of these components may be in communication with one another (e.g., via one or more buses).

The receiver 410 may provide a means for receiving information such as packets, user data, control information, or any combination thereof associated with various information channels (e.g., control channels, data channels, information channels related to techniques for enhanced handling of network measurements). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to techniques for enhanced handling of network measurements). In some examples, the transmitter 415 may be co-located with a receiver 410 in a transceiver component. The transmitter 415 may utilize a single antenna or a set of multiple antennas.

The communications manager 420, the receiver 410, the transmitter 415, or various combinations thereof or various components thereof may be examples of means for performing various aspects of techniques for enhanced handling of network measurements as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 420 may be configured to perform various operations (e.g., receiving, monitoring, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to receive information, transmit information, or perform various other operations as described herein.

The communications manager 420 may support wireless communications at a UE in accordance with examples as disclosed herein. For example, the communications manager 420 may be configured as or otherwise support a means for establishing a radio resource control connection with a base station. The communications manager 420 may be configured as or otherwise support a means for receiving, from the base station, parameters associated with a set of multiple frequency bands, the parameters indicating a priority of each frequency band of the set of multiple frequency bands. The communications manager 420 may be configured as or otherwise support a means for measuring, based on the priority, one or more frequencies of at least one frequency band (e.g., each frequency band) of the set of multiple frequency bands. The communications manager 420 may be configured as or otherwise support a means for transmitting, to the base station, a measurement report including measurements of one or more frequency bands of the set of multiple frequency bands.

Figure 5:
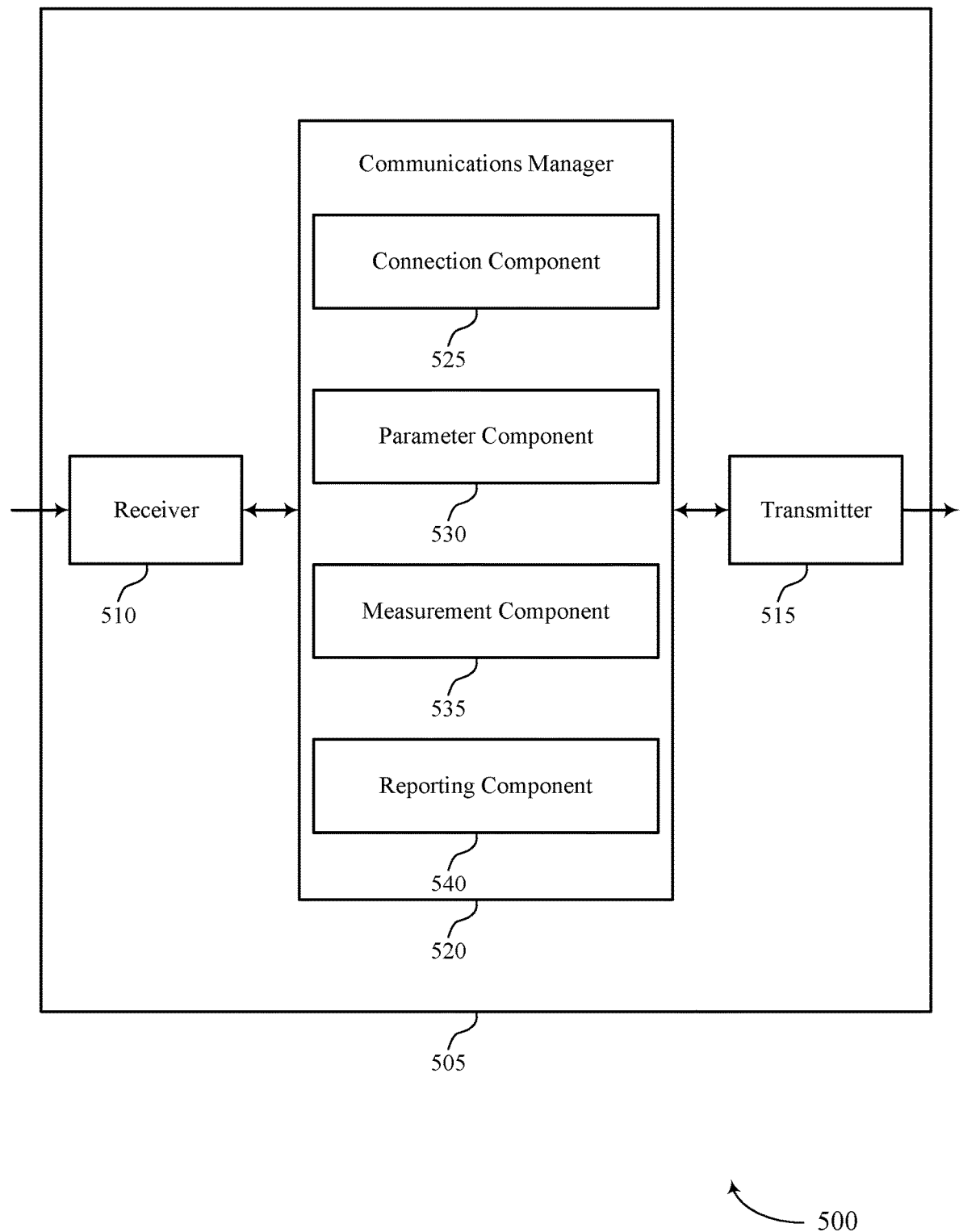

FIG. 5 shows a block diagram 500 of a device 505 that supports techniques for enhanced handling of network measurements in accordance with various aspects of the present disclosure. The device 505 may be an example of aspects of a device 405 or a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for enhanced handling of network measurements). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for enhanced handling of network measurements). In some examples, the transmitter 515 may be co-located with a receiver 510 in a transceiver component. The transmitter 515 may utilize a single antenna or a set of multiple antennas.

The device 505, or various components thereof, may be an example of means for performing various aspects of techniques for enhanced handling of network measurements as described herein. For example, the communications manager 520 may include a connection component 525, a parameter component 530, a measurement component 535, a reporting component 540, or any combination thereof. The communications manager 520 may be an example of aspects of a communications manager 420 as described herein. In some examples, the communications manager 520, or various components thereof, may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communications at a UE in accordance with examples as disclosed herein. The connection component 525 may be configured as or otherwise support a means for establishing a radio resource control connection with a base station. The parameter component 530 may be configured as or otherwise support a means for receiving, from the base station, parameters associated with a set of multiple frequency bands, the parameters indicating a priority of each frequency band of the set of multiple frequency bands. The measurement component 535 may be configured as or otherwise support a means for measuring, based on the priority, one or more frequencies of at least one frequency band of the set of multiple frequency bands. The reporting component 540 may be configured as or otherwise support a means for transmitting, to the base station, a measurement report including measurements of one or more frequency bands of the set of multiple frequency bands.

Figure 6:
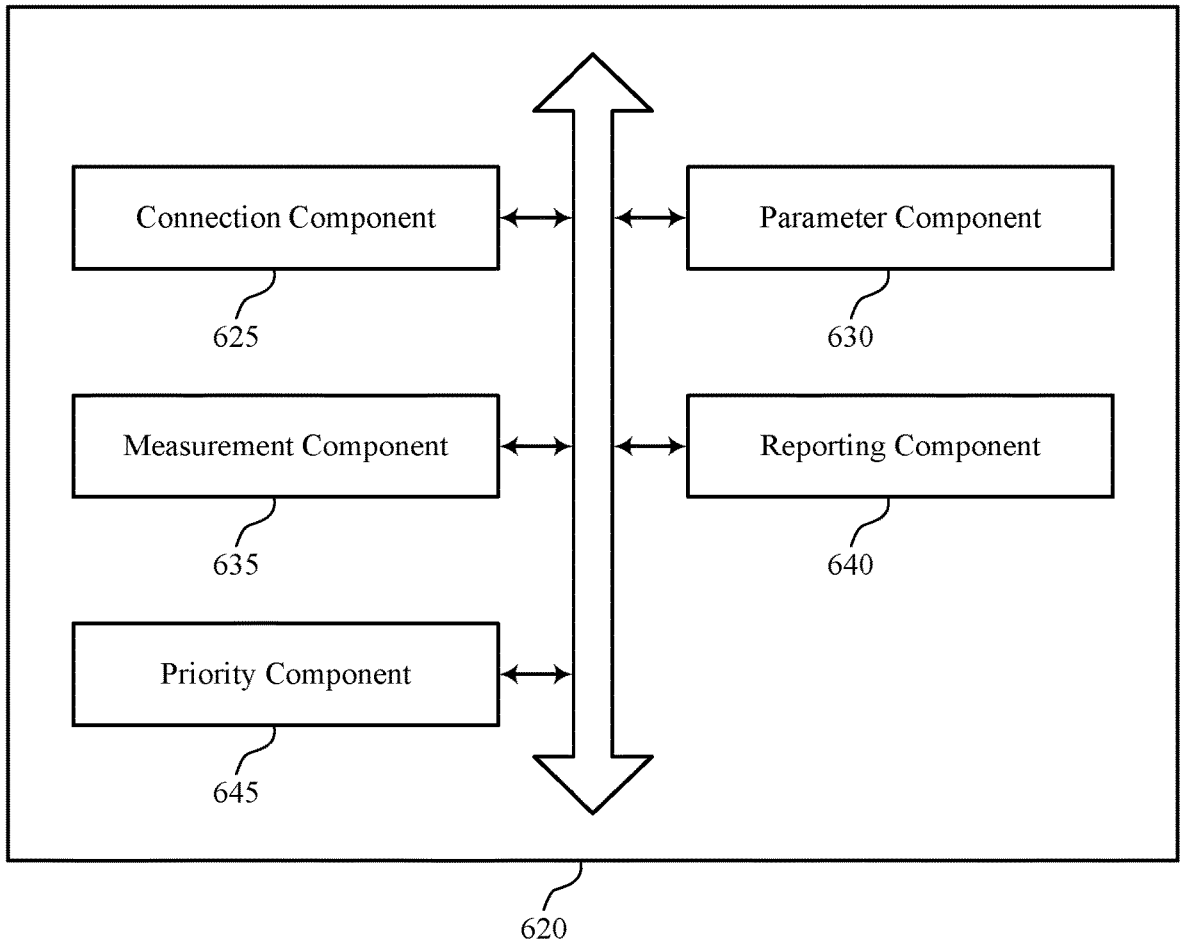
FIG. 6 shows a block diagram of a communications manager that supports techniques for enhanced handling of network measurements in accordance with various aspects of the present disclosure.

FIG. 6 shows a block diagram 600 of a communications manager 620 that supports techniques for enhanced handling of network measurements in accordance with various aspects of the present disclosure. The communications manager 620 may be an example of aspects of a communications manager 420, a communications manager 520, or both, as described herein. The communications manager 620, or various components thereof, may be an example of means for performing various aspects of techniques for enhanced handling of network measurements as described herein. For example, the communications manager 620 may include a connection component 625, a parameter component 630, a measurement component 635, a reporting component 640, a priority component 645, or any combination thereof. Each of these components may communicate, directly or indirectly, with one another (e.g., via one or more buses).

The communications manager 620 may support wireless communications at a UE in accordance with examples as disclosed herein. The connection component 625 may be configured as or otherwise support a means for establishing a radio resource control connection with a base station. The parameter component 630 may be configured as or otherwise support a means for receiving, from the base station, parameters associated with a set of multiple frequency bands, the parameters indicating a priority of each frequency band of the set of multiple frequency bands. The measurement component 635 may be configured as or otherwise support a means for measuring, based on the priority, one or more frequencies of at least one frequency band of the set of multiple frequency bands. The reporting component 640 may be configured as or otherwise support a means for transmitting, to the base station, a measurement report including measurements of one or more frequency bands of the set of multiple frequency bands.

In some examples, the priority component 645 may be configured as or otherwise support a means for transmitting, to the base station, an indication of the priority to measure each frequency band of the set of multiple frequency bands. In some examples, the parameter component 630 may be configured as or otherwise support a means for receiving a configuration of the set of multiple frequency bands based on the indication. In some examples, the indication of the priority is based on a location of the UE.

In some examples, the measurement component 635 may be configured as or otherwise support a means for configuring a measurement gap for each frequency band of the set of multiple frequency bands based on the priority. In some examples, a first measurement gap is associated with a first frequency band of the set of multiple frequency bands. In some examples, the measurements include reference signal received power measurements or reference signal received quality measurements, or a combination thereof.

In some examples, the reporting component 640 may be configured as or otherwise support a means for transmitting the measurement report of a first measurement of a first frequency band, based on the first measurement satisfying a measurement threshold. In some examples, the measurement threshold includes a network measurement threshold and a UE measurement threshold.

In some examples, the reporting component 640 may be configured as or otherwise support a means for transmitting the measurement report after the time delay based on at least one measurement satisfying a network measurement threshold and failing to satisfy a UE measurement threshold.

In some examples, the measurement component 635 may be configured as or otherwise support a means for performing measurements (e.g., additional measurements) of frequency bands of the set of multiple frequency bands based on the time delay of transmitting the measurement report.

In some examples, the priority includes measuring each frequency band of the set of multiple frequency bands in an order of frequency range of each frequency band of the set of multiple frequency bands.

In some examples, the priority includes measuring each frequency band of the set of multiple frequency bands in order of a presence of each frequency band of the set of multiple frequency bands within a database. In some examples, the priority includes measuring each frequency band of the set of multiple frequency bands based on a duplexing configuration of each frequency band of the set of multiple frequency bands.

In some examples, the priority includes measuring each frequency band of the set of multiple frequency bands based on a time to trigger configuration of each frequency band of the set of multiple frequency bands. In some examples, the priority includes measuring each frequency band of the set of multiple frequency bands based on a system bandwidth configuration of each frequency band of the set of multiple frequency bands.

Figure 7:
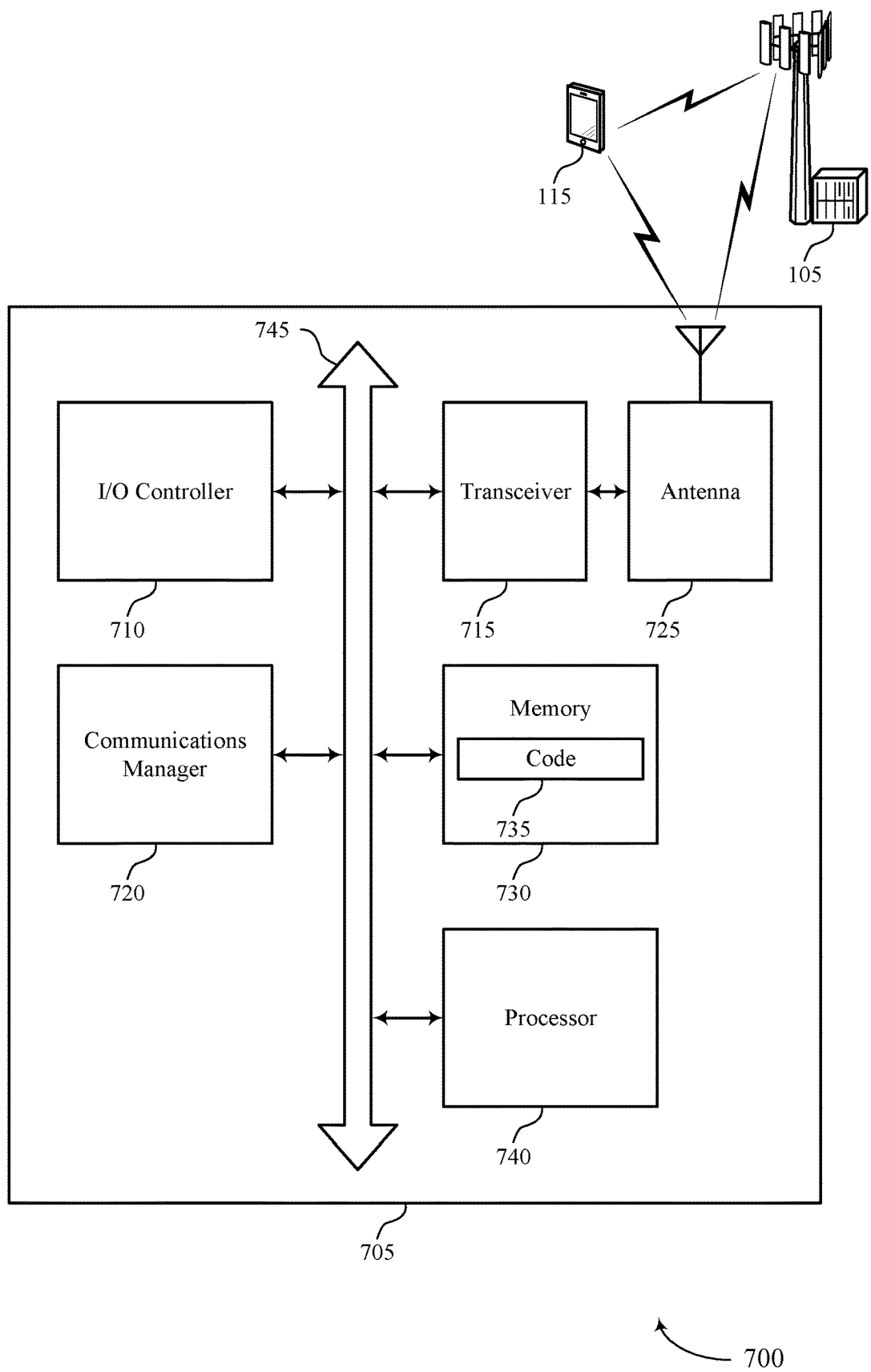
FIG. 7 shows a diagram of a system including a device that supports techniques for enhanced handling of network measurements in accordance with various aspects of the present disclosure.

FIG. 7 shows a diagram of a system 700 including a device 705 that supports techniques for enhanced handling of network measurements in accordance with various aspects of the present disclosure. The device 705 may be an example of or include the components of a device 405, a device 505, or a UE 115 as described herein. The device 705 may communicate wirelessly with one or more base stations 105, UEs 115, or any combination thereof. The device 705 may include components for bi-directional voice and data communications including components for transmitting and receiving communications, such as a communications manager 720, an input/output (I/O) controller 710, a transceiver 715, an antenna 725, a memory 730, code 735, and a processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally or alternatively, the I/O controller 710 may represent or interact with a modem, a keyboard, a mouse, a touchscreen, or a similar device. In some cases, the I/O controller 710 may be implemented as part of a processor, such as the processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include random access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (e.g., when compiled and executed) to perform functions described herein. In some cases, the memory 730 may contain, among other things, a basic I/O system (BIOS) which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting techniques for enhanced handling of network measurements). For example, the device 705 or a component of the device 705 may include a processor 740 and memory 730 coupled to the processor 740, the processor 740 and memory 730 configured to perform various functions described herein.

The communications manager 720 may support wireless communications at a UE in accordance with examples as disclosed herein. For example, the communications manager 720 may be configured as or otherwise support a means for establishing a radio resource control connection with a base station. The communications manager 720 may be configured as or otherwise support a means for receiving, from the base station, parameters associated with a set of multiple frequency bands, the parameters indicating a priority of each frequency band of the set of multiple frequency bands. The communications manager 720 may be configured as or otherwise support a means for measuring, based on the priority, one or more frequencies of at least one frequency band of the set of multiple frequency bands. The communications manager 720 may be configured as or otherwise support a means for transmitting, after a time delay to the base station, a measurement report including measurements of one or more frequency bands of the set of multiple frequency bands.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of techniques for enhanced handling of network measurements as described herein, or the processor 740 and the memory 730 may be otherwise configured to perform or support such operations.

Figure 8:
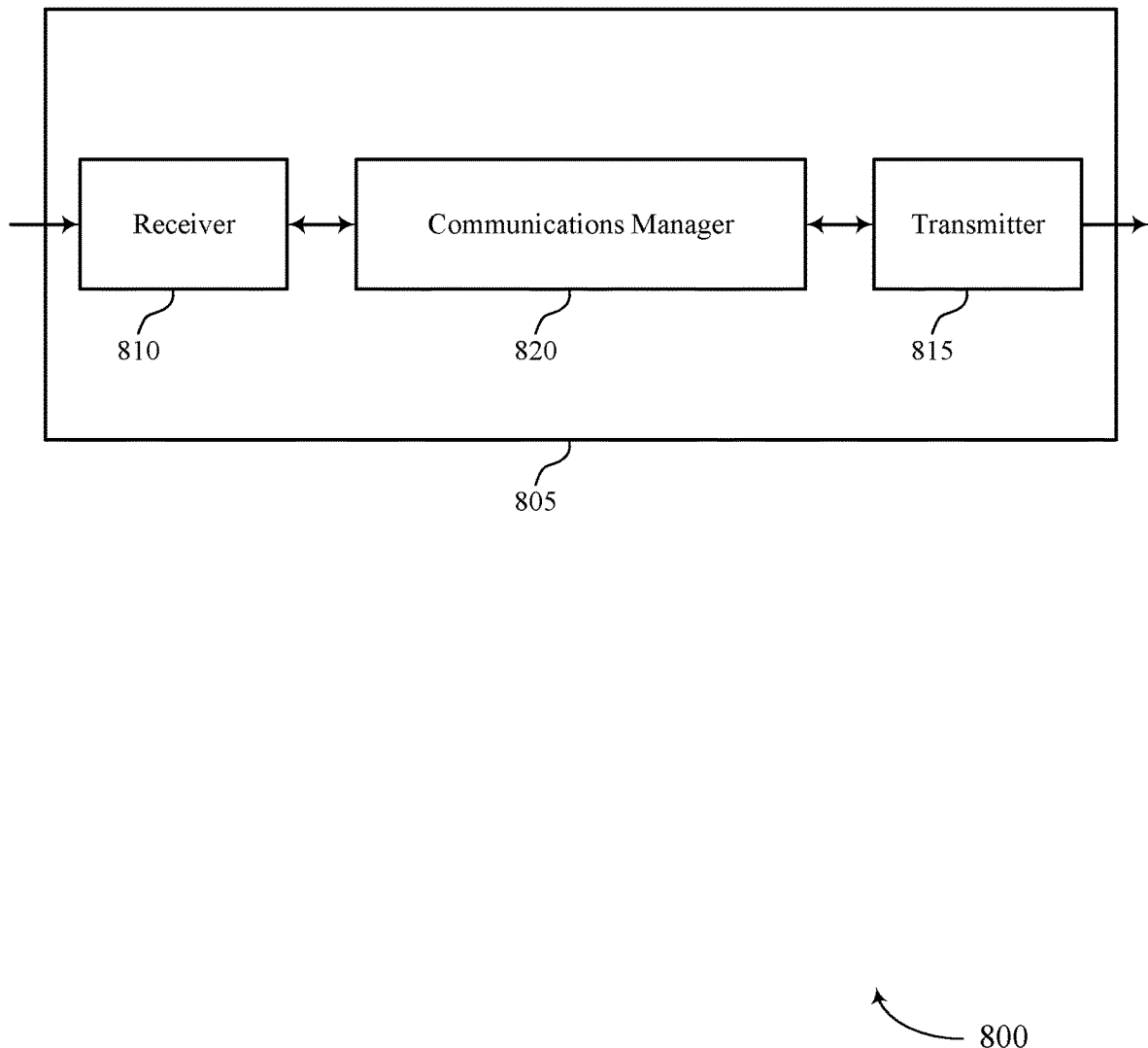
FIGS. 8 and 9 show block diagrams of devices that support techniques for enhanced handling of network measurements in accordance with various aspects of the present disclosure.

FIG. 8 shows a block diagram 800 of a device 805 that supports techniques for enhanced handling of network measurements in accordance with various aspects of the present disclosure. The device 805 may be an example of aspects of a base station 105 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to techniques for enhanced handling of network measurements). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to techniques for enhanced handling of network measurements). In some examples, the transmitter 815 may be co-located with a receiver 810 in a transceiver component. The transmitter 815 may utilize a single antenna or a set of multiple antennas.

The communications manager 820, the receiver 810, the transmitter 815, or various combinations thereof or various components thereof may be examples of means for performing various aspects of techniques for enhanced handling of network measurements as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 820 may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communications at a base station in accordance with examples as disclosed herein. For example, the communications manager 820 may be configured as or otherwise support a means for establishing a radio resource control connection with a UE. The communications manager 820 may be configured as or otherwise support a means for transmitting, to the UE, parameters associated with a set of multiple frequency bands, the parameters indicating a priority of each frequency band of the set of multiple frequency bands. The communications manager 820 may be configured as or otherwise support a means for receiving, after a time delay and from the UE, a measurement report including measurements of one or more frequency bands of the set of multiple frequency bands, the measurements performed according to the indicated priority.

By including or configuring the communications manager 820 in accordance with examples as described herein, the device 805 (e.g., a processor controlling or otherwise coupled to the receiver 810, the transmitter 815, the communications manager 820, or a combination thereof) may support techniques for reducing power consumption and increasing battery life by efficiently determining which frequency bands to report to a base station. For example, the communications manager 820 may identify the order in which to measure frequency bands, and determine which measurements satisfy a threshold for reporting. Thus, the communications manager 820 may aid in avoiding transmitting unnecessary reports, or reports for lower quality frequency bands.

Figure 9:
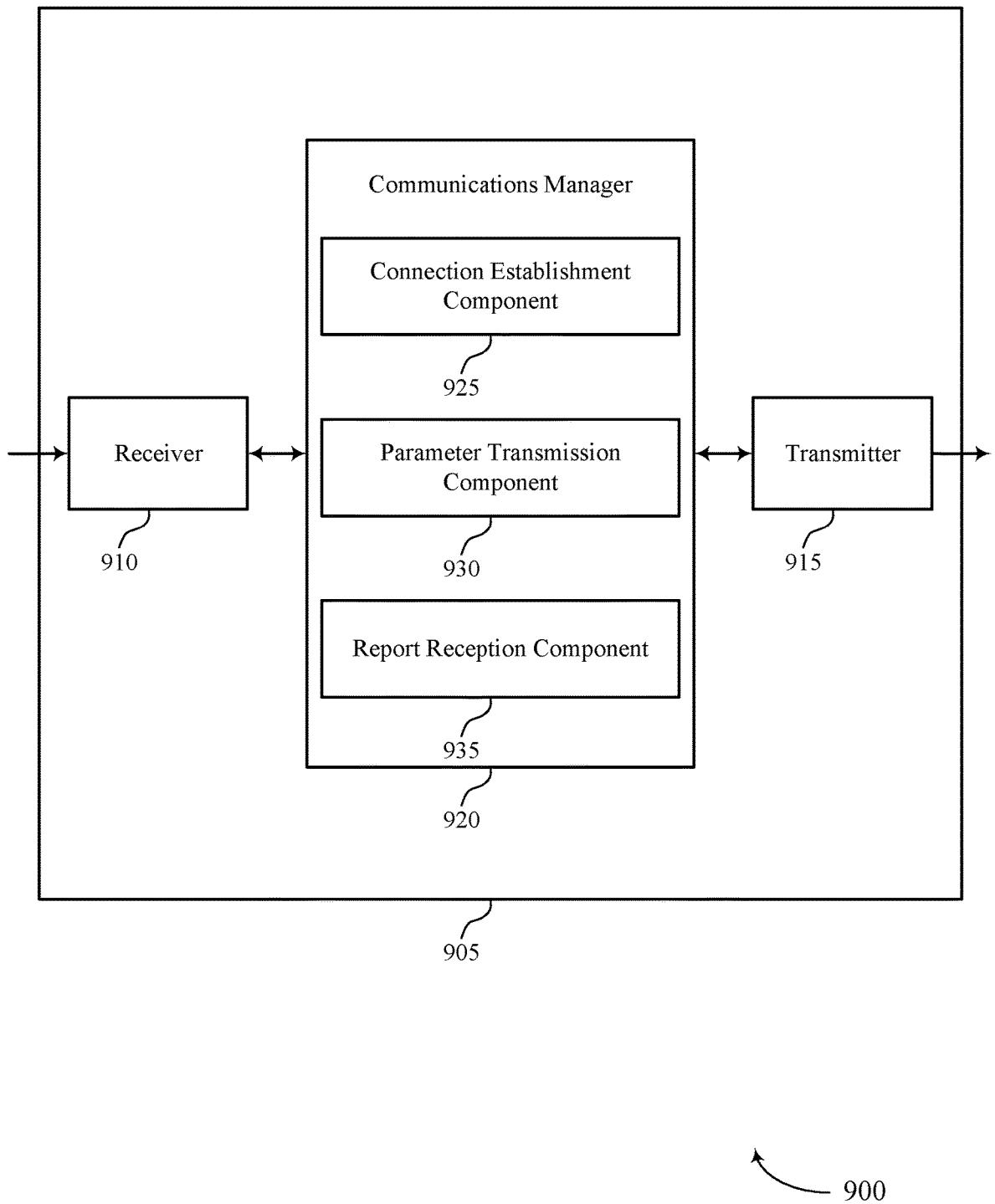

FIG. 9 shows a block diagram 900 of a device 905 that supports techniques for enhanced handling of network measurements in accordance with various aspects of the present disclosure. The device 905 may be an example of aspects of a device 805 or a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to techniques for enhanced handling of network measurements). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to techniques for enhanced handling of network measurements). In some examples, the transmitter 915 may be co-located with a receiver 910 in a transceiver component. The transmitter 915 may utilize a single antenna or a set of multiple antennas.

The device 905, or various components thereof, may be an example of means for performing various aspects of techniques for enhanced handling of network measurements as described herein. For example, the communications manager 920 may include a connection establishment component 925, a parameter transmission component 930, a report reception component 935, or any combination thereof. The communications manager 920 may be an example of aspects of a communications manager 820 as described herein. In some examples, the communications manager 920, or various components thereof, may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a base station in accordance with examples as disclosed herein. The connection establishment component 925 may be configured as or otherwise support a means for establishing a radio resource control connection with a UE. The parameter transmission component 930 may be configured as or otherwise support a means for transmitting, to the UE, parameters associated with a set of multiple frequency bands, the parameters indicating a priority of each frequency band of the set of multiple frequency bands. The report reception component 935 may be configured as or otherwise support a means for receiving, after a time delay and from the UE, a measurement report including measurements of one or more frequency bands of the set of multiple frequency bands, the measurements performed according to the indicated priority.

Figure 10:
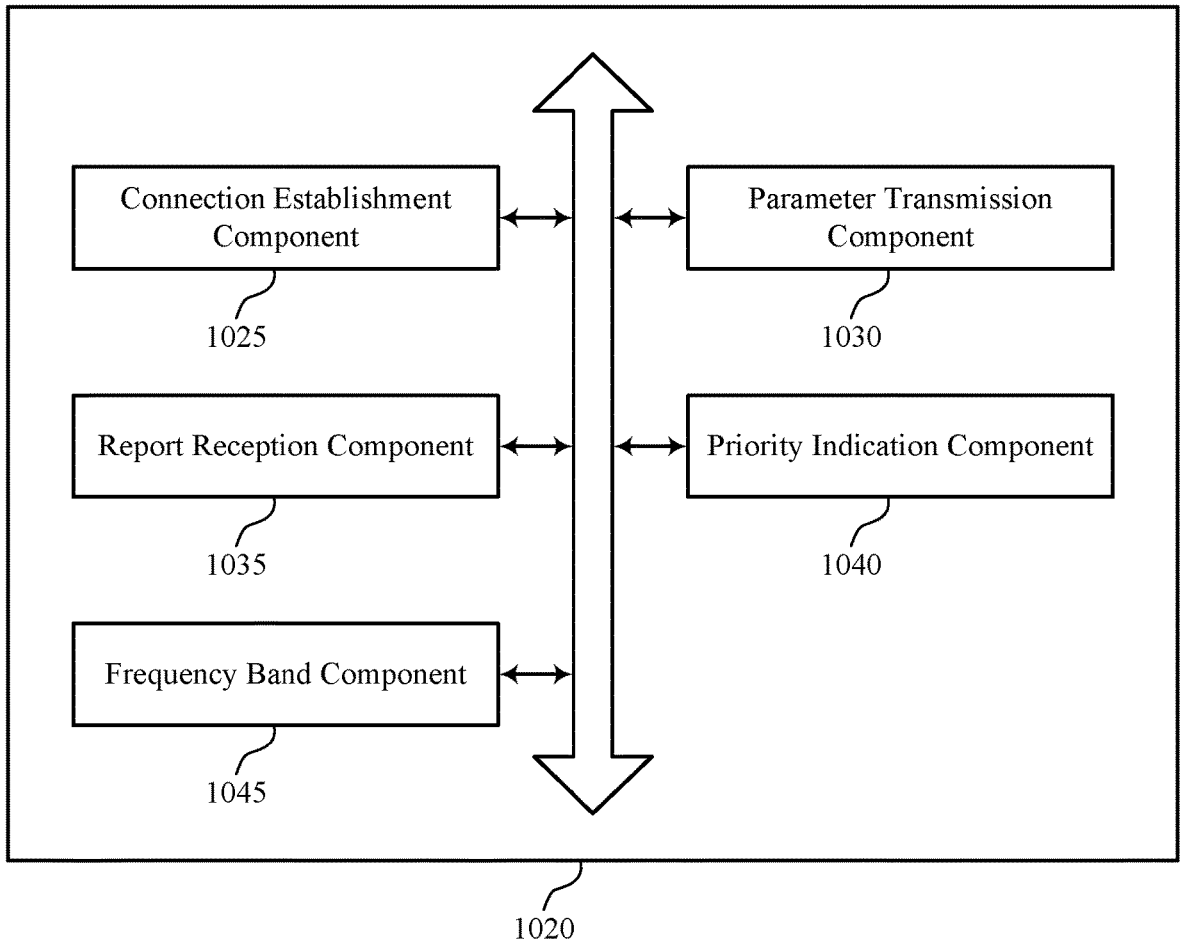
FIG. 10 shows a block diagram of a communications manager that supports techniques for enhanced handling of network measurements in accordance with various aspects of the present disclosure.

FIG. 10 shows a block diagram 1000 of a communications manager 1020 that supports techniques for enhanced handling of network measurements in accordance with various aspects of the present disclosure. The communications manager 1020 may be an example of aspects of a communications manager 820, a communications manager 920, or both, as described herein. The communications manager 1020, or various components thereof, may be an example of means for performing various aspects of techniques for enhanced handling of network measurements as described herein. For example, the communications manager 1020 may include a connection establishment component 1025, a parameter transmission component 1030, a report reception component 1035, a priority indication component 1040, a frequency band component 1045, or any combination thereof. Each of these components may communicate, directly or indirectly, with one another (e.g., via one or more buses).

The communications manager 1020 may support wireless communications at a base station in accordance with examples as disclosed herein. The connection establishment component 1025 may be configured as or otherwise support a means for establishing a radio resource control connection with a UE. The parameter transmission component 1030 may be configured as or otherwise support a means for transmitting, to the UE, parameters associated with a set of multiple frequency bands, the parameters indicating a priority of each frequency band of the set of multiple frequency bands. The report reception component 1035 may be configured as or otherwise support a means for receiving, after a time delay and from the UE, a measurement report including measurements of one or more frequency bands of the set of multiple frequency bands, the measurements performed according to the indicated priority.

In some examples, the priority indication component 1040 may be configured as or otherwise support a means for receiving, from the UE, an indication of the priority to measure the frequency bands. In some examples, the frequency band component 1045 may be configured as or otherwise support a means for transmitting a configuration of the set of multiple frequency bands based on the indication. In some examples, the indication is based on a location of the UE.

In some examples, the measurements include reference signal received power measurements or reference signal received quality measurements, or a combination thereof. In some examples, the report reception component 1035 may be configured as or otherwise support a means for receiving the measurement report of a first measurement of a first frequency band, based on the first measurement satisfying a measurement threshold. In some examples, the measurement threshold includes a network measurement threshold and a UE measurement threshold.

In some examples, the report reception component 1035 may be configured as or otherwise support a means for receiving the measurement report after the time delay based on at least one measurement satisfying a network measurement threshold and failing to satisfy a UE measurement threshold. In some examples, the priority includes measuring each frequency band of the set of multiple frequency bands in an order of frequency range of each frequency band of the set of multiple frequency bands.

In some examples, the priority includes measuring each frequency band of the set of multiple frequency bands in order of a presence of each frequency band of the set of multiple frequency bands within a database. In some examples, the priority includes measuring each frequency band of the set of multiple frequency bands based on a duplexing configuration of each frequency band of the set of multiple frequency bands.

In some examples, the priority includes measuring each frequency band of the set of multiple frequency bands based on a time to trigger configuration of each frequency band of the set of multiple frequency bands. In some examples, the priority includes measuring each frequency band of the set of multiple frequency bands based on a system bandwidth configuration of each frequency band of the set of multiple frequency bands.

Figure 11:
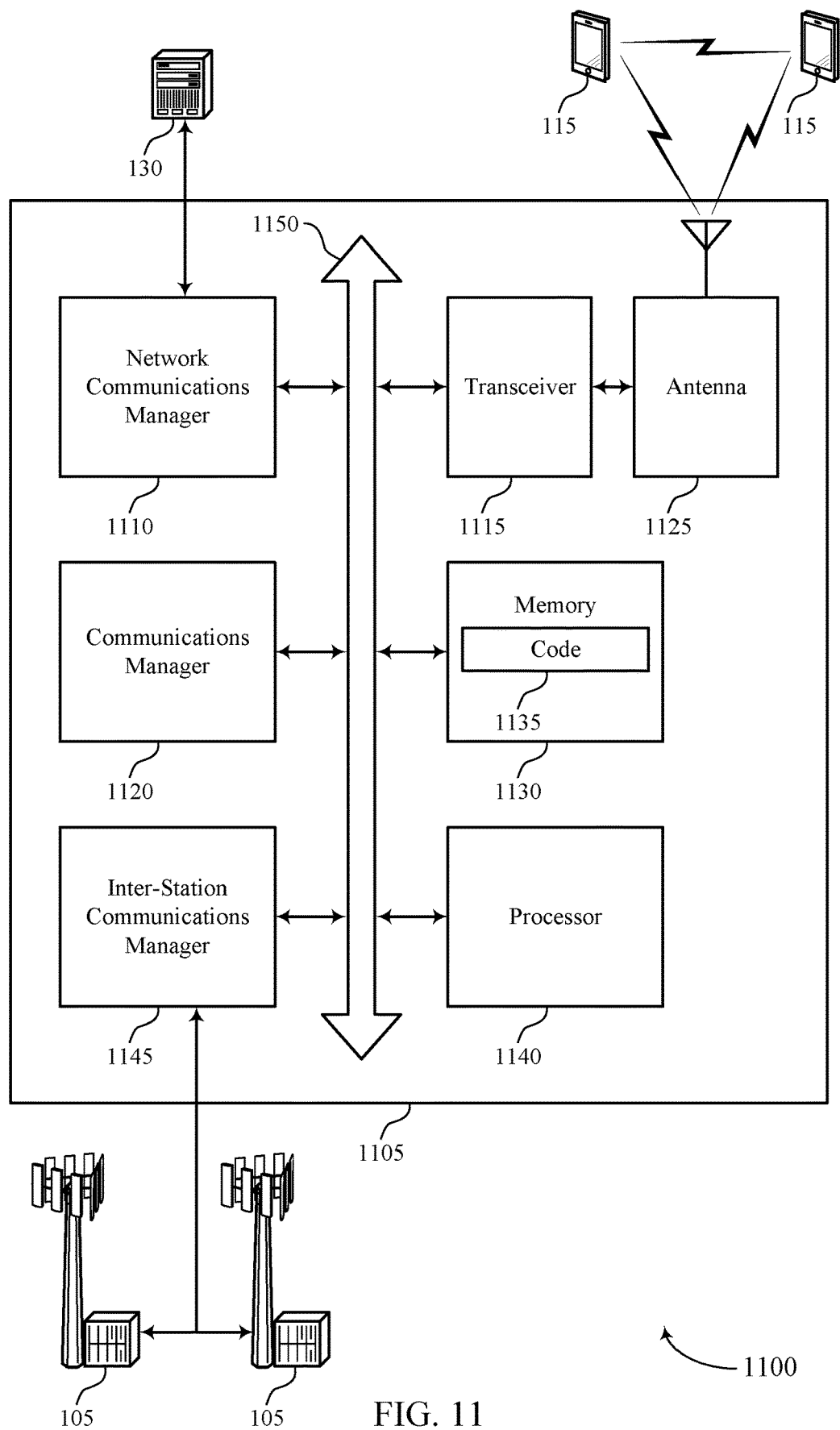
FIG. 11 shows a diagram of a system including a device that supports techniques for enhanced handling of network measurements in accordance with various aspects of the present disclosure.

FIG. 11 shows a diagram of a system 1100 including a device 1105 that supports techniques for enhanced handling of network measurements in accordance with various aspects of the present disclosure. The device 1105 may be an example of or include the components of a device 805, a device 905, or a base station 105 as described herein. The device 1105 may communicate wirelessly with one or more base stations 105, UEs 115, or any combination thereof. The device 1105 may include components for bi-directional voice and data communications including components for transmitting and receiving communications, such as a communications manager 1120, a network communications manager 1110, a transceiver 1115, an antenna 1125, a memory 1130, code 1135, a processor 1140, and an inter-station communications manager 1145. These components may be in electronic communication or otherwise coupled (e.g., operatively, communicatively, functionally, electronically, electrically) via one or more buses (e.g., a bus 1150).

The network communications manager 1110 may manage communications with a core network 130 (e.g., via one or more wired backhaul links). For example, the network communications manager 1110 may manage the transfer of data communications for client devices, such as one or more UEs 115.

In some cases, the device 1105 may include a single antenna 1125. However, in some other cases the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include RAM and ROM. The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a BIOS which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting techniques for enhanced handling of network measurements). For example, the device 1105 or a component of the device 1105 may include a processor 1140 and memory 1130 coupled to the processor 1140, the processor 1140 and memory 1130 configured to perform various functions described herein.

The inter-station communications manager 1145 may manage communications with other base stations 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communications network technology to provide communication between base stations 105.

The communications manager 1120 may support wireless communications at a base station in accordance with examples as disclosed herein. For example, the communications manager 1120 may be configured as or otherwise support a means for establishing a radio resource control connection with a UE. The communications manager 1120 may be configured as or otherwise support a means for transmitting, to the UE, parameters associated with a set of multiple frequency bands, the parameters indicating a priority of each frequency band of the set of multiple frequency bands. The communications manager 1120 may be configured as or otherwise support a means for receiving, after a time delay and from the UE, a measurement report including measurements of one or more frequency bands of the set of multiple frequency bands, the measurements performed according to the indicated priority.

By including or configuring the communications manager 1120 in accordance with examples as described herein, the device 1105 may support techniques for identifying high quality and low interference frequency bands to use for a cell. The communications manager 1120 may efficiently operate to determine a set of frequency bands to measure according to a priority, and therefore determine a high quality cell. Further, the communications manager 1120 may save battery by avoiding transmitting measurement reports for frequency bands that do not meet a threshold.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of techniques for enhanced handling of network measurements as described herein, or the processor 1140 and the memory 1130 may be otherwise configured to perform or support such operations.

Figure 12:
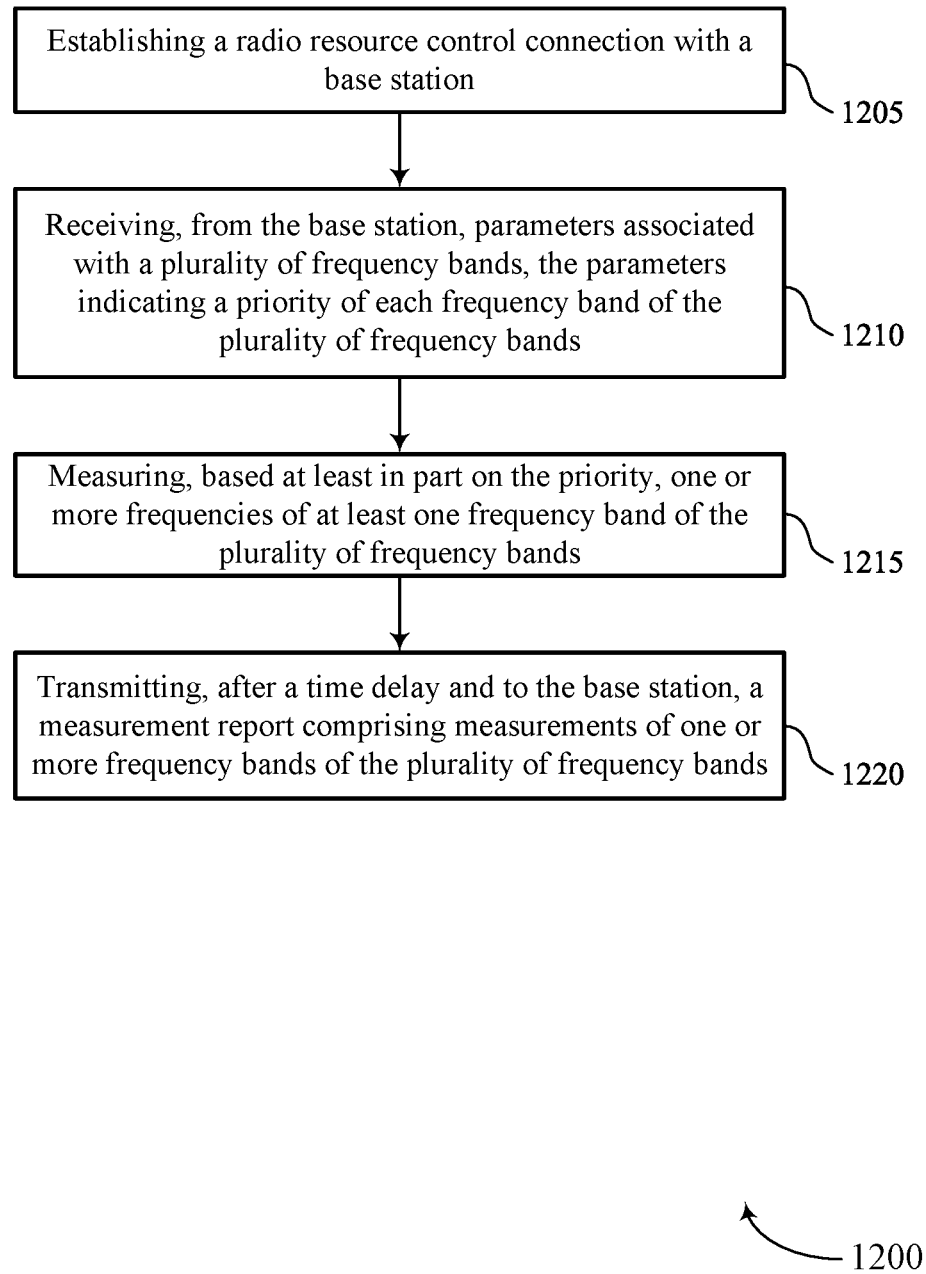
FIGS. 12 through 15 show flowcharts illustrating methods that support techniques for enhanced handling of network measurements in accordance with various aspects of the present disclosure.

FIG. 12 shows a flowchart illustrating a method 1200 that supports techniques for enhanced handling of network measurements in accordance with various aspects of the present disclosure. The operations of the method 1200 may be implemented by a UE or its components as described herein. For example, the operations of the method 1200 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1205, the method may include establishing a radio resource control connection with a base station. The operations of 1205 may be performed in accordance with examples as disclosed herein. In some examples, aspects of the operations of 1205 may be performed by a connection component 625 as described with reference to FIG. 6.

At 1210, the method may include receiving, from the base station, parameters associated with a set of multiple frequency bands, the parameters indicating a priority of each frequency band of the set of multiple frequency bands. The operations of 1210 may be performed in accordance with examples as disclosed herein. In some examples, aspects of the operations of 1210 may be performed by a parameter component 630 as described with reference to FIG. 6.

At 1215, the method may include measuring, based on the priority, one or more frequencies of at least one frequency band of the set of multiple frequency bands. The operations of 1215 may be performed in accordance with examples as disclosed herein. In some examples, aspects of the operations of 1215 may be performed by a measurement component 635 as described with reference to FIG. 6.

At 1220, the method may include transmitting, after a time delay and to the base station, a measurement report including measurements of one or more frequency bands of the set of multiple frequency bands. The operations of 1220 may be performed in accordance with examples as disclosed herein. In some examples, aspects of the operations of 1220 may be performed by a reporting component 640 as described with reference to FIG. 6.

Figure 13:
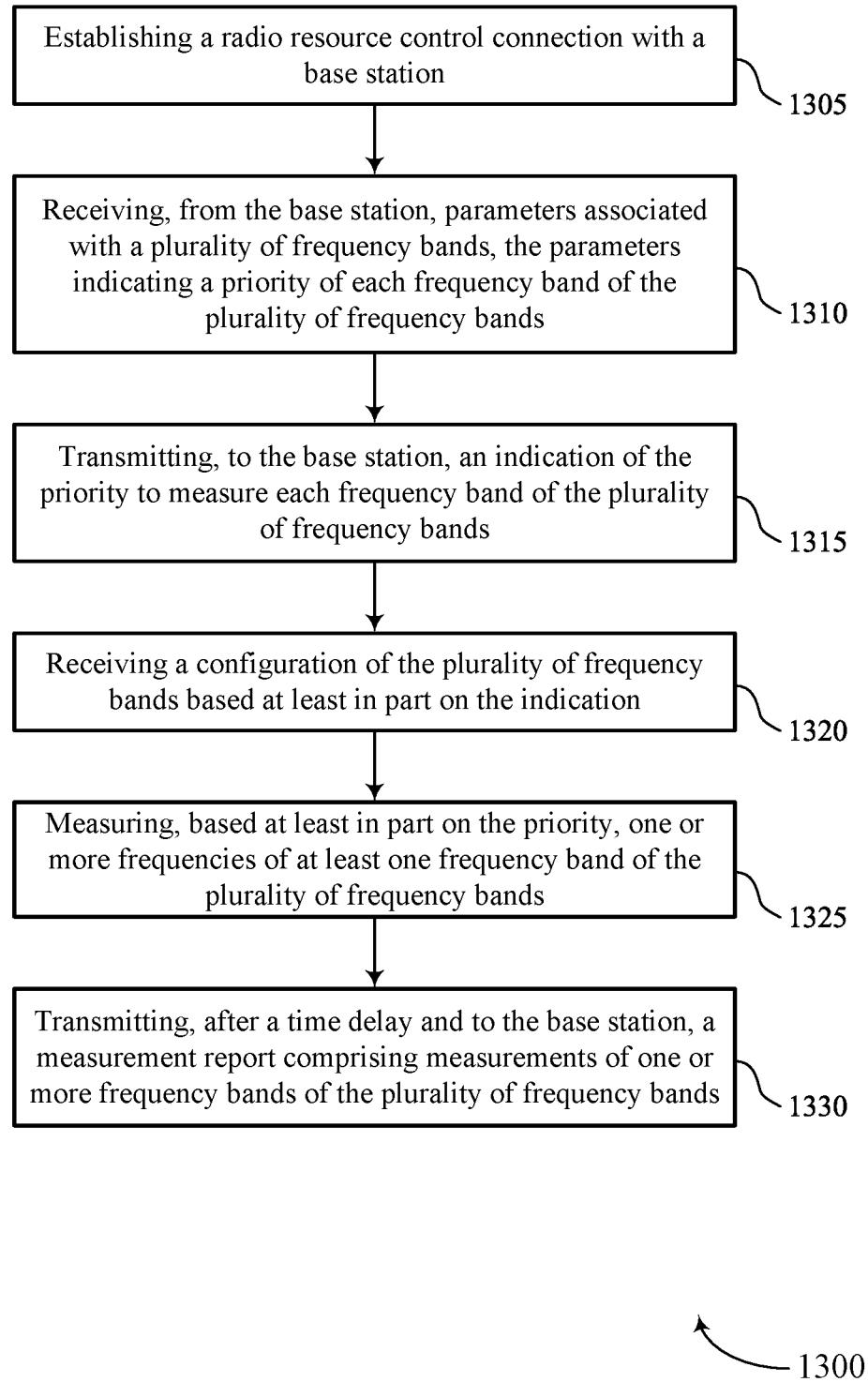

FIG. 13 shows a flowchart illustrating a method 1300 that supports techniques for enhanced handling of network measurements in accordance with various aspects of the present disclosure. The operations of the method 1300 may be implemented by a UE or its components as described herein. For example, the operations of the method 1300 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1305, the method may include establishing a radio resource control connection with a base station. The operations of 1305 may be performed in accordance with examples as disclosed herein. In some examples, aspects of the operations of 1305 may be performed by a connection component 625 as described with reference to FIG. 6.

At 1310, the method may include receiving, from the base station, parameters associated with a set of multiple frequency bands, the parameters indicating a priority of each frequency band of the set of multiple frequency bands. The operations of 1310 may be performed in accordance with examples as disclosed herein. In some examples, aspects of the operations of 1310 may be performed by a parameter component 630 as described with reference to FIG. 6.

At 1315, the method may include transmitting, to the base station, an indication of the priority to measure each frequency band of the set of multiple frequency bands. The operations of 1315 may be performed in accordance with examples as disclosed herein. In some examples, aspects of the operations of 1315 may be performed by a priority component 645 as described with reference to FIG. 6.

At 1320, the method may include receiving a configuration of the set of multiple frequency bands based on the indication. The operations of 1320 may be performed in accordance with examples as disclosed herein. In some examples, aspects of the operations of 1320 may be performed by a parameter component 630 as described with reference to FIG. 6.

At 1325, the method may include measuring, based on the priority, one or more frequencies of at least one frequency band of the set of multiple frequency bands. The operations of 1325 may be performed in accordance with examples as disclosed herein. In some examples, aspects of the operations of 1325 may be performed by a measurement component 635 as described with reference to FIG. 6.

At 1330, the method may include transmitting, after a time delay and to the base station, a measurement report including measurements of one or more frequency bands of the set of multiple frequency bands. The operations of 1330 may be performed in accordance with examples as disclosed herein. In some examples, aspects of the operations of 1330 may be performed by a reporting component 640 as described with reference to FIG. 6.

Figure 14:
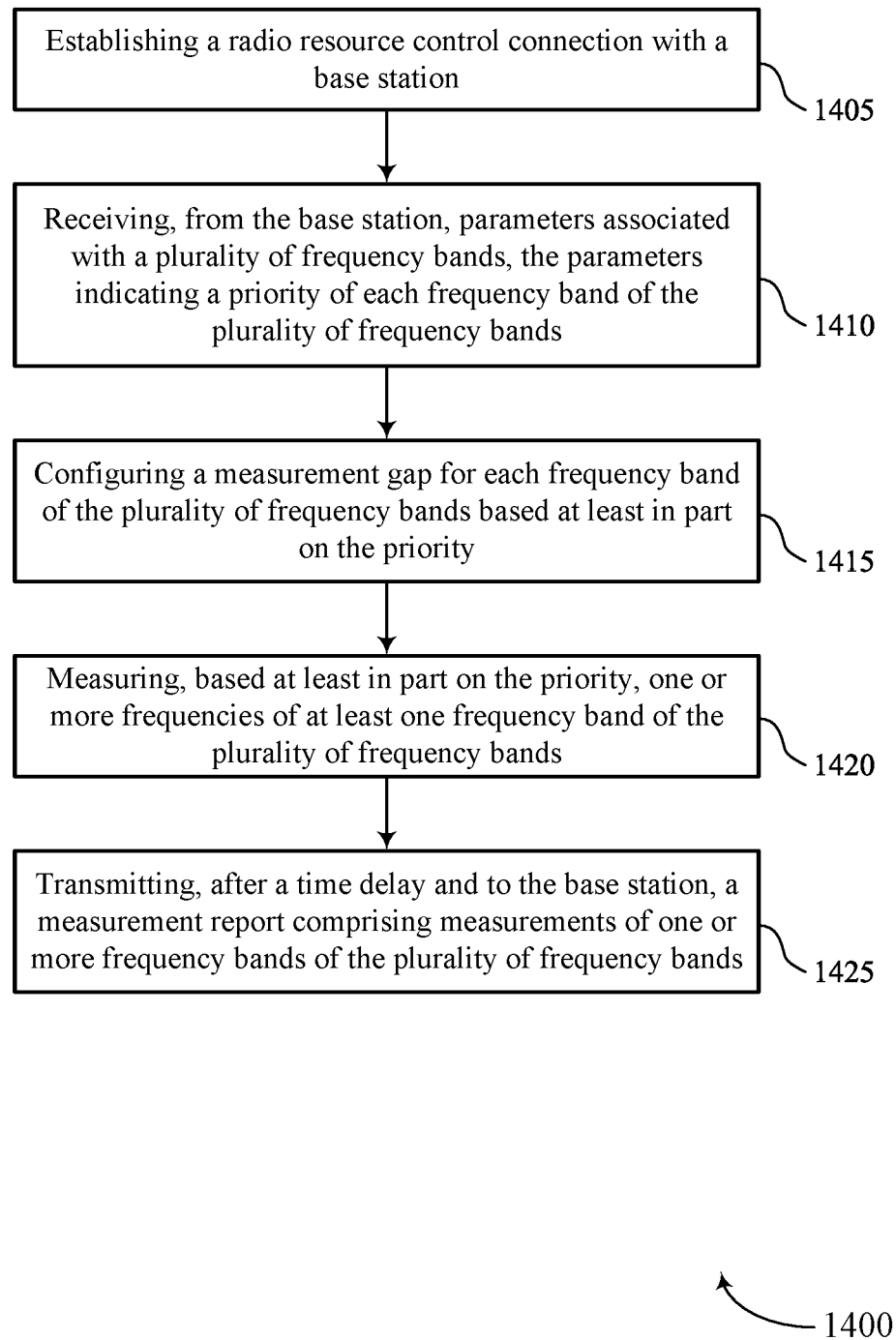

FIG. 14 shows a flowchart illustrating a method 1400 that supports techniques for enhanced handling of network measurements in accordance with various aspects of the present disclosure. The operations of the method 1400 may be implemented by a UE or its components as described herein. For example, the operations of the method 1400 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1405, the method may include establishing a radio resource control connection with a base station. The operations of 1405 may be performed in accordance with examples as disclosed herein. In some examples, aspects of the operations of 1405 may be performed by a connection component 625 as described with reference to FIG. 6.

At 1410, the method may include receiving, from the base station, parameters associated with a set of multiple frequency bands, the parameters indicating a priority of each frequency band of the set of multiple frequency bands. The operations of 1410 may be performed in accordance with examples as disclosed herein. In some examples, aspects of the operations of 1410 may be performed by a parameter component 630 as described with reference to FIG. 6.

At 1415, the method may include configuring a measurement gap for each frequency band of the set of multiple frequency bands based on the priority. The operations of 1415 may be performed in accordance with examples as disclosed herein. In some examples, aspects of the operations of 1415 may be performed by a measurement component 635 as described with reference to FIG. 6.

At 1420, the method may include measuring, based on the priority, one or more frequencies of at least one frequency band of the set of multiple frequency bands. The operations of 1420 may be performed in accordance with examples as disclosed herein. In some examples, aspects of the operations of 1420 may be performed by a measurement component 635 as described with reference to FIG. 6.

At 1425, the method may include transmitting, after a time delay and to the base station, a measurement report including measurements of one or more frequency bands of the set of multiple frequency bands. The operations of 1425 may be performed in accordance with examples as disclosed herein. In some examples, aspects of the operations of 1425 may be performed by a reporting component 640 as described with reference to FIG. 6.

Figure 15:
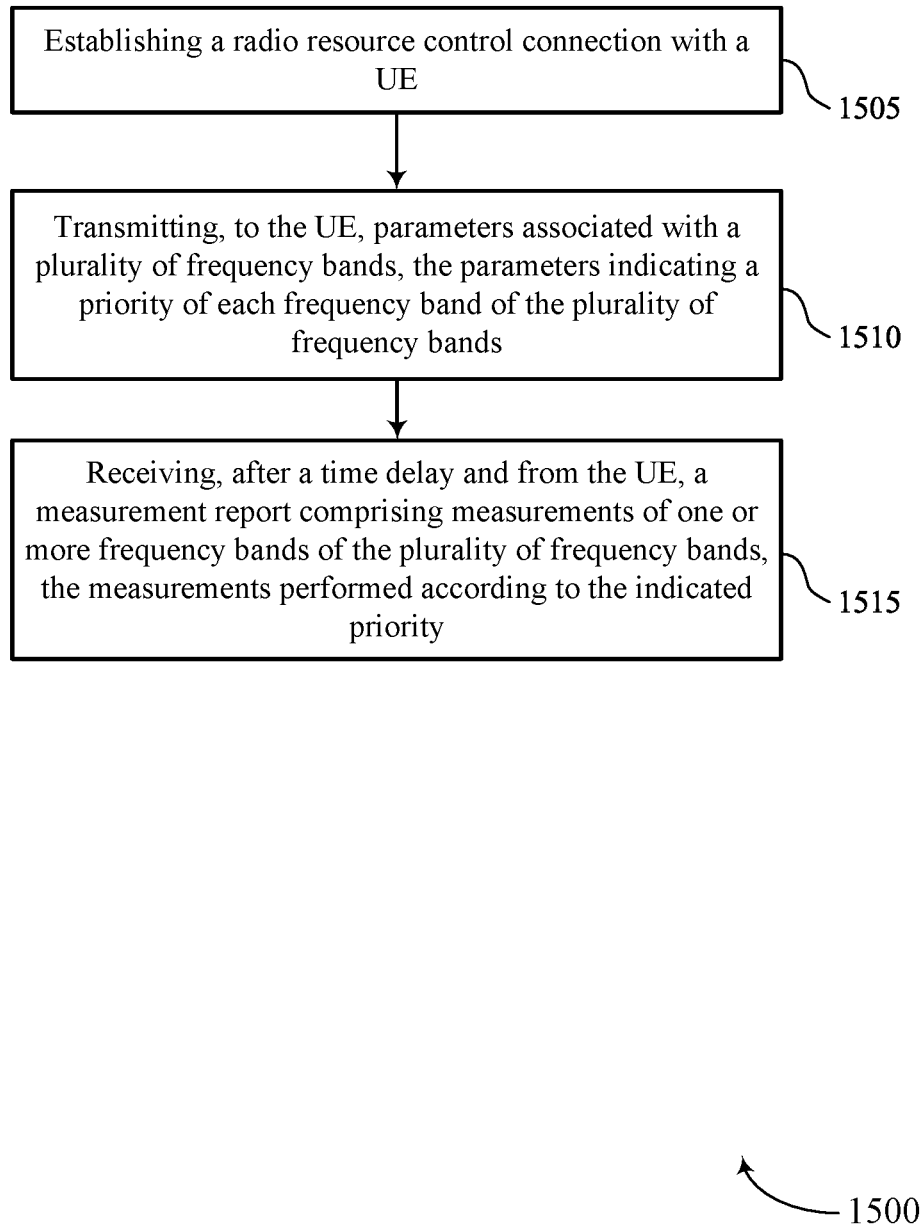

FIG. 15 shows a flowchart illustrating a method 1500 that supports techniques for enhanced handling of network measurements in accordance with various aspects of the present disclosure. The operations of the method 1500 may be implemented by a base station or its components as described herein. For example, the operations of the method 1500 may be performed by a base station 105 as described with reference to FIGS. 1 through 3 and 8 through 11. In some examples, a base station may execute a set of instructions to control the functional elements of the base station to perform the described functions. Additionally or alternatively, the base station may perform aspects of the described functions using special-purpose hardware.

At 1505, the method may include establishing a radio resource control connection with a UE. The operations of 1505 may be performed in accordance with examples as disclosed herein. In some examples, aspects of the operations of 1505 may be performed by a connection establishment component 1025 as described with reference to FIG. 10.

At 1510, the method may include transmitting, to the UE, parameters associated with a set of multiple frequency bands, the parameters indicating a priority of each frequency band of the set of multiple frequency bands. The operations of 1510 may be performed in accordance with examples as disclosed herein. In some examples, aspects of the operations of 1510 may be performed by a parameter transmission component 1030 as described with reference to FIG. 10.

At 1515, the method may include receiving, after a time delay and from the UE, a measurement report including measurements of one or more frequency bands of the set of multiple frequency bands, the measurements performed according to the indicated priority. The operations of 1515 may be performed in accordance with examples as disclosed herein. In some examples, aspects of the operations of 1515 may be performed by a report reception component 1035 as described with reference to FIG. 10.

The following provides an overview of aspects of the present disclosure:

Aspect 1: A method for wireless communications at a UE, comprising: establishing a radio resource control connection with a base station, receiving, from the base station, parameters associated with a plurality of frequency bands, the parameters indicating a priority of each frequency band of the plurality of frequency bands; measuring, based at least in part on the priority, one or more frequencies of at least one frequency band of the plurality of frequency bands, and transmitting, after a time delay and to the base station, a measurement report comprising measurements of one or more frequency bands of the plurality of frequency bands.

Aspect 2: The method of aspect 1, further comprising: transmitting, to the base station, an indication of the priority to measure each frequency band of the plurality of frequency bands; and receiving a configuration of the plurality of frequency bands based at least in part on the indication.

Aspect 3: The method of aspect 2, wherein the indication of the priority is based at least in part on a location of the UE.

Aspect 4: The method of any of aspects 1 through 3, further comprising: configuring a measurement gap for each frequency band of the plurality of frequency bands based at least in part on the priority.

Aspect 5: The method of aspect 4, wherein a first measurement gap is associated with a first frequency band of the plurality of frequency bands.

Aspect 6: The method of any of aspects 1 through 5, wherein the measurements comprise reference signal received power measurements or reference signal received quality measurements, or a combination thereof.

Aspect 7: The method of any of aspects 1 through 6, further comprising: transmitting the measurement report of a first measurement of a first frequency band, based at least in part on the first measurement satisfying a measurement threshold.

Aspect 8: The method of aspect 7, wherein the measurement threshold comprises a network measurement threshold and a UE measurement threshold.

Aspect 9: The method of any of aspects 1 through 8, wherein the time delay is based at least in part on at least one measurement satisfying a network measurement threshold and failing to satisfy a UE measurement threshold.

Aspect 10: The method of aspect 9, further comprising: performing measurements of the at least one frequency band of the plurality of frequency bands based at least in part on the time delay of transmitting the measurement report.

Aspect 11: The method of any of aspects 1 through 10, wherein the priority comprises measuring each frequency band of the plurality of frequency bands in an order of frequency range of each frequency band of the plurality of frequency bands.

Aspect 12: The method of aspect 11, wherein the priority comprises measuring each frequency band of the plurality of frequency bands in order of a presence of each frequency band of the plurality of frequency bands within a database.

Aspect 13: The method of aspect 12, wherein the priority comprises measuring each frequency band of the plurality of frequency bands based at least in part on a duplexing configuration of each frequency band of the plurality of frequency bands.

Aspect 14: The method of aspect 13, wherein the priority comprises measuring each frequency band of the plurality of frequency bands based at least in part on a time to trigger configuration of each frequency band of the plurality of frequency bands.

Aspect 15: The method of aspect 14, wherein the priority comprises measuring each frequency band of the plurality of frequency bands based at least in part on a system bandwidth configuration of each frequency band of the plurality of frequency bands.

Aspect 16: A method for wireless communications at a base station, comprising: establishing a radio resource control connection with a UE; transmitting, to the UE, parameters associated with a plurality of frequency bands, the parameters indicating a priority of each frequency band of the plurality of frequency bands; and receiving, after a time delay and from the UE, a measurement report comprising measurements of one or more frequency bands of the plurality of frequency bands, the measurements performed according to the indicated priority.

Aspect 17: The method of aspect 16, further comprising: receiving, from the UE, an indication of the priority to measure the frequency bands; and transmitting a configuration of the plurality of frequency bands based at least in part on the indication.

Aspect 18: The method of aspect 17, wherein the indication is based at least in part on a location of the UE.

Aspect 19: The method of any of aspects 16 through 18, wherein the measurements comprise reference signal received power measurements or reference signal received quality measurements, or a combination thereof.

Aspect 20: The method of any of aspects 16 through 19, further comprising: receiving the measurement report of a first measurement of a first frequency band, based at least in part on the first measurement satisfying a measurement threshold.

Aspect 21: The method of aspect 20, wherein the measurement threshold comprises a network measurement threshold and a UE measurement threshold.

Aspect 22: The method of any of aspects 16 through 21, wherein the time delay is based at least in part on at least one measurement satisfying a network measurement threshold and failing to satisfy a UE measurement threshold.

Aspect 23: The method of any of aspects 16 through 22, wherein the priority comprises measuring each frequency band of the plurality of frequency bands in an order of frequency range of each frequency band of the plurality of frequency bands.

Aspect 24: The method of aspect 23, wherein the priority comprises measuring each frequency band of the plurality of frequency bands in order of a presence of each frequency band of the plurality of frequency bands within a database.

Aspect 25: The method of aspect 24, wherein the priority comprises measuring each frequency band of the plurality of frequency bands based at least in part on a duplexing configuration of each frequency band of the plurality of frequency bands.

Aspect 26: The method of aspect 25, wherein the priority comprises measuring each frequency band of the plurality of frequency bands based at least in part on a time to trigger configuration of each frequency band of the plurality of frequency bands.

Aspect 27: The method of aspect 26, wherein the priority comprises measuring each frequency band of the plurality of frequency bands based at least in part on a system bandwidth configuration of each frequency band of the plurality of frequency bands.

Aspect 28: An apparatus for wireless communications at a UE, comprising a processor; memory coupled with the processor; and instructions stored in the memory and executable by the processor to cause the apparatus to perform a method of any of aspects 1 through 15.

Aspect 29: An apparatus for wireless communications at a UE, comprising at least one means for performing a method of any of aspects 1 through 15.

Aspect 30: A non-transitory computer-readable medium storing code for wireless communications at a UE, the code comprising instructions executable by a processor to perform a method of any of aspects 1 through 15.

Aspect 31: An apparatus for wireless communications at a base station, comprising a processor; memory coupled with the processor; and instructions stored in the memory and executable by the processor to cause the apparatus to perform a method of any of aspects 16 through 27.

Aspect 32: An apparatus for wireless communications at a base station, comprising at least one means for performing a method of any of aspects 16 through 27.

Aspect 33: A non-transitory computer-readable medium storing code for wireless communications at a base station, the code comprising instructions executable by a processor to perform a method of any of aspects 16 through 27.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
    establishing a radio resource control connection with a network entity;
    receiving, from the network entity, parameters associated with a plurality of frequency bands, the parameters indicating a respective priority of each frequency band of the plurality of frequency bands;
    measuring, based at least in part on a priority of at least one frequency band, one or more frequencies of the at least one frequency band of the plurality of frequency bands; and
    transmitting, after a time delay and to the network entity, a measurement report comprising measurements of one or more frequency bands of the plurality of frequency bands, wherein the time delay is associated with measurement of at least one other frequency band of the plurality of frequency bands.

2. The method of claim 1, further comprising:
    transmitting, to the network entity, an indication of the priority to measure each frequency band of the plurality of frequency bands; and
    receiving a configuration of the plurality of frequency bands based at least in part on the indication.

3. The method of claim 2, wherein the indication of the priority is based at least in part on a location of the UE.

4. The method of claim 1, further comprising:
    configuring a measurement gap for each frequency band of the plurality of frequency bands based at least in part on the priority.

5. The method of claim 4, wherein a first measurement gap is associated with a first frequency band of the plurality of frequency bands.

6. The method of claim 1, wherein the measurements comprise reference signal received power measurements or reference signal received quality measurements, or a combination thereof.

7. The method of claim 1, further comprising:
    transmitting the measurement report of a first measurement of a first frequency band, based at least in part on the first measurement satisfying a measurement threshold.

8. The method of claim 7, wherein the measurement threshold comprises a network measurement threshold and a UE measurement threshold.

9. The method of claim 1, wherein the time delay is based at least in part on at least one measurement satisfying a network measurement threshold and failing to satisfy a UE measurement threshold.

10. The method of claim 9, further comprising:
    performing measurements of the at least one frequency band of the plurality of frequency bands based at least in part on the time delay of transmitting the measurement report.

11. The method of claim 1, wherein the parameters comprise a frequency range associated with each frequency band of the plurality of frequency bands, and wherein measuring the one or more frequencies comprises:
    measuring the one or more frequencies of the at least one frequency band based at least in part on an order of the frequency range of each frequency band of the plurality of frequency bands.

12. The method of claim 11, wherein the parameters comprise a database presence associated with each frequency band of the plurality of frequency bands, and wherein measuring the one or more frequencies comprises:
    measuring the one or more frequencies of the at least one frequency band based at least in part on an order of the database presence of each frequency band of the plurality of frequency bands.

13. The method of claim 12, wherein the parameters comprise a duplexing configuration of each frequency band of the plurality of frequency bands, and wherein measuring the one or more frequencies comprises:
    measuring the one or more frequencies of the at least one frequency band based at least in part on the duplexing configuration of each frequency band of the plurality of frequency bands.

14. The method of claim 13, wherein the parameters comprise a time to trigger configuration of each frequency band of the plurality of frequency bands, and wherein measuring the one or more frequencies comprises:
    measuring the one or more frequencies of the at least one frequency band based at least in part on the time to trigger configuration of each frequency band of the plurality of frequency bands.

15. The method of claim 14, wherein the parameters comprise a system bandwidth configuration of each frequency band of the plurality of frequency bands, and wherein measuring the one or more frequencies comprises:
    measuring the one or more frequencies of the at least one frequency band based at least in part on the system bandwidth configuration of each frequency band of the plurality of frequency bands.

16. A method for wireless communications at a network entity, comprising:
- establishing a radio resource control connection with a user equipment (UE);
- transmitting, to the UE, parameters associated with a plurality of frequency bands, the parameters indicating a respective priority of each frequency band of the plurality of frequency bands; and
- receiving, after a time delay and from the UE, a measurement report comprising measurements of one or more frequency bands of the plurality of frequency bands, the measurements performed according to an indicated priority of the one or more frequency bands, wherein the time delay is associated with measurement of at least one other frequency band of the plurality of frequency bands.

17. The method of claim 16, further comprising:
- receiving, from the UE, an indication of the respective priority to measure each frequency band of the plurality of frequency bands; and
- transmitting a configuration of the plurality of frequency bands based at least in part on the indication.

18. The method of claim 17, wherein the indication is based at least in part on a location of the UE.

19. The method of claim 16, wherein the measurements comprise reference signal received power measurements or reference signal received quality measurements, or a combination thereof.

20. The method of claim 16, further comprising:
- receiving the measurement report of a first measurement of a first frequency band, based at least in part on the first measurement satisfying a measurement threshold.

21. The method of claim 20, wherein the measurement threshold comprises a network measurement threshold and a UE measurement threshold.

22. The method of claim 16, wherein the time delay is based at least in part on at least one measurement satisfying a network measurement threshold and failing to satisfy a UE measurement threshold.

23. The method of claim 16, wherein the parameters comprise frequency range of each frequency band of the plurality of frequency bands, and wherein the measurements are performed according to the frequency range.

24. The method of claim 23, wherein the parameters comprise a presence of each frequency band of the plurality of frequency bands within a database, and wherein the measurements are performed according to the presence within the database.

25. The method of claim 24, wherein the parameters comprise a duplexing configuration of each frequency band of the plurality of frequency bands, and wherein the measurements are performed according to the duplexing configuration.

26. The method of claim 25, wherein the parameters comprise a time to trigger configuration of each frequency band of the plurality of frequency bands, and wherein the measurements are performed according to the time to trigger configuration.

27. The method of claim 26, wherein the parameters comprise a system bandwidth configuration of each frequency band of the plurality of frequency bands, and wherein the measurements are performed according to the system bandwidth configuration.

28. A user equipment (UE) for wireless communications, comprising:
- one or more memories storing processor-executable code; and
- one or more processors coupled with the one or more memories and individually or collectively operable to execute the code to cause the UE to:
    - establish a radio resource control connection with a network entity;
    - receive, from the network entity, parameters associated with a plurality of frequency bands, the parameters indicating a respective priority of each frequency band of the plurality of frequency bands;
    - measure, based at least in part on a priority of at least one frequency band, one or more frequencies of the at least one frequency band of the plurality of frequency bands; and
    - transmit, after a time delay and to the network entity, a measurement report comprising measurements of one or more frequency bands of the plurality of frequency bands, wherein the time delay is associated with measurement of at least one other frequency band of the plurality of frequency bands.

29. The UE of claim 28, wherein the one or more processors are individually or collectively operable to execute the code to cause the UE to:
- transmit, to the network entity, an indication of the priority to measure each frequency band of the plurality of frequency bands; and
- receive a configuration of the plurality of frequency bands based at least in part on the indication.

30. A network entity for wireless communications, comprising:
- one or more memories storing processor-executable code; and
- one or more processors coupled with the one or more memories and individually or collectively operable to execute the code to cause the network entity to:
    - establish a radio resource control connection with a user equipment (UE);
    - transmit, to the UE, parameters associated with a plurality of frequency bands, the parameters indicating a respective priority of each frequency band of the plurality of frequency bands; and
    - receive, after a time delay and from the UE, a measurement report comprising measurements of one or more frequency bands of the plurality of frequency bands, the measurements performed according to an indicated priority of the one or more frequency bands, wherein the time delay is associated with measurement of at least one other frequency band of the plurality of frequency bands.

* * * * *